US009034288B2

(12) United States Patent
Baugh et al.

(10) Patent No.: US 9,034,288 B2
(45) Date of Patent: May 19, 2015

(54) ALKANOLAMINE $CO_2$ SCRUBBING PROCESS

(75) Inventors: Lisa S. Baugh, Ringoes, NJ (US); Pavel Kortunov, Flemington, NJ (US); David C. Calabro, Bridgewater, NJ (US); Michael Siskin, Westfield, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 898 days.

(21) Appl. No.: 13/229,174

(22) Filed: Sep. 9, 2011

(65) Prior Publication Data

US 2012/0063980 A1    Mar. 15, 2012

Related U.S. Application Data

(60) Provisional application No. 61/420,960, filed on Dec. 8, 2010, provisional application No. 61/381,281, filed on Sep. 9, 2010, provisional application No. 61/381,294, filed on Sep. 9, 2010, provisional (Continued)

(51) Int. Cl.
*B01D 53/62* (2006.01)
*B01D 53/78* (2006.01)
(Continued)

(52) U.S. Cl.
CPC ........ *B01D 53/1475* (2013.01); *B01D 53/1493* (2013.01); *B01D 53/62* (2013.01); *B01D 2252/20415* (2013.01);
(Continued)

(58) Field of Classification Search
None
See application file for complete search history.

(56) References Cited

U.S. PATENT DOCUMENTS 3,347,621 A    10/1967 Papadopoulos et al.
3,794,586 A    2/1974 Kimura et al.
(Continued)

FOREIGN PATENT DOCUMENTS

CN    1354036    6/2002
CN    101279181    10/2008
(Continued)

OTHER PUBLICATIONS

S. Dinda et al., "Kinetics of reactive absorption of carbon dioxide with solutions of aniline in carbon tetrachloride and chloroform", Chemical Engineering Journal, 136 (2008), 349-357.
(Continued)

*Primary Examiner* — Stanley Silverman
*Assistant Examiner* — Daniel Berns
(74) *Attorney, Agent, or Firm* — Malcolm D. Keen; David M. Weisberg; Andrew T. Ward

(57) ABSTRACT

A $CO_2$ amine scrubbing process uses an absorbent mixture consisting of an alkanolamine $CO_2$ sorbent in combination with a non-nucleophilic base. The alkanolamine has oxygen and nitrogen sites capable of nucleophilic attack at the $CO_2$ carbon atom. The nucleophilic addition is promoted in the presence of the non-nucleophilic, relatively stronger base, acting as a proton acceptor. The non-nucleophilic base promoter, which may also act as a solvent for the alkanolamine, can promote reaction with the $CO_2$ at each of the reactive hydroxyl and nucleophilic amine group(s) of the alkanolamines. In the case of primary amino alkanolamines the $CO_2$ may be taken up by a double carboxylation reaction in which two moles of $CO_2$ are taken up by the reacting primary amine groups.

23 Claims, 8 Drawing Sheets

Related U.S. Application Data application No. 61/381,351, filed on Sep. 9, 2010, provisional application No. 61/420,978, filed on Dec. 8, 2010, provisional application No. 61/421,048, filed on Dec. 8, 2010.

(51) Int. Cl.
*B01D 53/96* (2006.01)
*B01D 53/14* (2006.01)

(52) U.S. Cl.
CPC ............... *B01D 2252/20421* (2013.01); *B01D 2252/20426* (2013.01); *B01D 2252/20431* (2013.01); *B01D 2252/20478* (2013.01); *B01D 2252/2056* (2013.01); *B01D 2252/30* (2013.01); *Y02C 10/04* (2013.01); *Y02C 10/06* (2013.01)

(56) References Cited

U.S. PATENT DOCUMENTS

| | | | |
|---|---|---|---|
| 4,100,257 | A | 7/1978 | Sartori et al. |
| 4,112,051 | A | 9/1978 | Sartori et al. |
| 4,410,335 | A | 10/1983 | Childs |
| 4,474,682 | A | 10/1984 | Billenstein et al. |
| 4,539,189 | A | 9/1985 | Starkston et al. |
| 4,624,838 | A | 11/1986 | Pan et al. |
| 4,636,323 | A | 1/1987 | Nagai et al. |
| 5,057,122 | A | 10/1991 | Blain et al. |
| 5,068,046 | A | 11/1991 | Blain et al. |
| 5,565,145 | A | 10/1996 | Watson et al. |
| 5,779,814 | A * | 7/1998 | Fellers et al. .................... 134/20 |
| 5,879,433 | A | 3/1999 | Gallup et al. |
| 6,075,000 | A | 6/2000 | Rohrbaugh et al. |
| 6,140,276 | A | 10/2000 | Duncum et al. |
| 6,552,239 | B1 * | 4/2003 | Brands ............................ 585/358 |
| 6,579,343 | B2 | 6/2003 | Brennecke et al. |
| 6,586,106 | B2 | 7/2003 | Shibuya et al. |
| 2002/0189444 | A1 | 12/2002 | Brennecke et al. |
| 2004/0035293 | A1 | 2/2004 | Davis, Jr. |
| 2005/0129598 | A1 | 6/2005 | Chinn et al. |
| 2005/0183337 | A1 | 8/2005 | Cadours et al. |
| 2005/0239974 | A1 | 10/2005 | Grimm et al. |
| 2005/0257421 | A1 | 11/2005 | Siggelkow et al. |
| 2006/0188423 | A1 | 8/2006 | Cadours et al. |
| 2006/0251558 | A1 | 11/2006 | Chinn et al. |
| 2007/0286783 | A1 | 12/2007 | Carrette et al. |
| 2008/0004362 | A1 | 1/2008 | Masuda et al. |
| 2008/0025893 | A1 | 1/2008 | Asprion et al. |
| 2008/0050296 | A1 | 2/2008 | Tontiwachwuthikul et al. |
| 2008/0141858 | A1 | 6/2008 | Liu et al. |
| 2008/0187485 | A1 | 8/2008 | Magne-Drisch et al. |
| 2009/0136402 | A1 | 5/2009 | Heldebrant et al. |
| 2009/0263302 | A1 | 10/2009 | Hu |
| 2009/0291874 | A1 | 11/2009 | Bara et al. |
| 2010/0288126 | A1 | 11/2010 | Agar et al. |
| 2011/0293498 | A1 | 12/2011 | Lahary et al. |
| 2013/0164200 | A1 * | 6/2013 | Lail et al. ....................... 423/210 |

FOREIGN PATENT DOCUMENTS

| | | | | |
|---|---|---|---|---|
| DE | 3504538 | | 9/1985 | |
| DE | 102008007087 | A1 | 8/2009 | |
| DE | 102008013738 | A1 | 9/2009 | |
| EP | 0 349 787 | B1 | 8/1994 | |
| EP | 0692558 | | 1/1996 | |
| FR | 2918386 | A1 | 7/2007 | |
| FR | 2936429 | * | 4/2010 | ............. B01D 53/62 |
| GB | 1 473 103 | A | 5/1977 | |
| JP | 56145984 | | 11/1981 | |
| JP | 61225293 | | 10/1986 | |
| JP | 2003193385 | | 7/2003 | |
| JP | 2005126279 | | 5/2005 | |
| JP | 2006150298 | | 6/2006 | |
| JP | 2007197503 | | 8/2007 | |
| WO | 2006103812 | A1 | 10/2006 | |
| WO | 2007/003618 | A1 | 1/2007 | |
| WO | 2008/007320 | A3 | 1/2008 | |
| WO | 2008/015217 | A1 | 2/2008 | |
| WO | 2008068411 | A2 | 6/2008 | |
| WO | 2008/094846 | A1 | 8/2008 | |
| WO | 2010089257 | A1 | 8/2010 | |

OTHER PUBLICATIONS

M. Smiglak et al., "Ionic liquids via reaction of the zwitterionic 1,3-dimethylimidazolium-2-carboxylate with protic acids. Overcoming synthetic limitations and establishing new halide free protocols for the formation of ILs", Green Chemistry, 9 (2007), 90-98.

A.M. Voutchkova et al., "Imidazolium Carboxylates as Versatile and Selective N-Heterocyclic Carbene Transfer Agents: Synthesis, Mechanism, and Applications", J. Amer. Chem. Soc., 129 (2007), 12834-46.

I. Tommasi & F. Sorrentino, "Synthesis of 1,3-dialkylimidazolium-2-carboxylates by direct carboxylation of 1,3-dialkylimidazolium chlorides with CO2", Tetrahedron Letters, 47 (2006), 6453-6.

H.A. Duong et al., "Reversible carboxylation of N-heterocyclic carbenes", Chem. Commun., 2004, 112-3.

A. Tudose et al., "Imidazol(in)ium-2-carboxylates as N-heterocyclic carbene precursors in ruthenium-arene catalysts for olefin metathesis and cyclopropanation", J. Organomet. Chem., 691 (2006), 5356-65.

n. J. Bridges et al., "An Intermediate for the Clean Synthesis of Ionic Liquids: Isolation and Crystal Structure of 1,3-Dimethylimidazolium Hydrogen Carbonate Monohydrate", Chem. Eur., 13 (2007), 5207-12.

H. Zhou et al., "CO2 Adducts of N-Heterocyclic Carbenes: Thermal Stability and Catalytic Activity toward the Coupling of CO2 with Epoxides", J. Org. Chem., 73 (2008), 8039-44.

E. Sada et al., "Reaction Kinetics of Carbon Dioxide with Amines in Non-aqueous Solvents", Chemical Engineering Journal, 33 (1986), 87-95.

P.J. Carvalho et al., "Specific Solvation Interactions of CO2 on Acetate and Trifluoroacetate Imidazolium Based Ionic Liquids at High Pressures", J. Phys. Chem. B, 113 (2009), 6803-12.

C. Cadena et al., "Why is CO2 So Soluble in Imidazolium-Based Ionic Liquids?", J. Am. Chem. Soc., 126 (2004), 5300-8.

A. Yokozeki et al., "Physical and Chemical Absorptions of Carbon Dioxide in Room-Temperature Ionic Liquids", J. Phys. Chem. B, 112 (2008), 16654-63.

M.B. Shiflett et al., "Phase behavior of {carbon dioxide+[bmim][Ac]} mixtures", J. Chem. Thermo. 40 (2008), 25-31.

E.J. Maginn, "Design and Evaluation of Ionic Liquids as Novel CO2 Absorbents", University of Notre Dame Quarterly Technical Report, May 31, 2005, DOE Award Number: DE-FG26-04NT42122.

Z.J. Dijkstra et al., "Formation of carbamic acid in organic solvents and in supercritical carbon dioxide", J. Supercritical Fluids, 41 (2007), 109-114.

K. Masuda et al., "Studies on the solvent dependence of the carbamic acid formation from omega-(1-naphthyl) alkylamines and carbon dioxide", Tetrahedron, 61 (2005), 213-229.

E.M. Hampe & D.M. Rudkevich, "Reversible covalent chemistry of CO2", Chem. Commun. (2002), 1450-51.

D.J. Heldebrant et al., "CO2-Binding Organic Liquids (CO2BOLs) for Acid Gas Capture", Pacific Northwest Laboratory.

P.G. Jessop et al., "Reversible nonpolar-to-polar solvent", Nature, v. 436, Aug. 25, 2005, p. 1102.

D.J. Heldebrant et al., "Organic liquid CO2 capture agents with high gravimetric CO2 capacity", Energy & Environmental Science, 1 (2008), 487-93.

L. Phan et al., "Switchable Solvents Consisting of Amidine/Alcohol or Guanidine/Alcohol Mixtures", Ind. Eng. Chem. Res., 47 (2008), 539-45.

E.M. Hampe & D.M. Rudkevich, "Exploring reversible reactions between CO2 and amines", Tetrahedron, 59 (2003), 9619-25.

Y. Kayaki et al., "Utilization of N,N-Dialkylcarbamic Acid Derived from Secondary Amines and Supercritical Carbon Dioxide:

(56) References Cited

OTHER PUBLICATIONS

Stereoselective Synthesis of Z Alkenyl Carbamates with a CO2-Soluble Ruthenium-P(OC2H5)3 Catalyst", Chem. Asian J., 3 (2008), 1865-70.

E. Sada et al., "Chemical Kinetics of the Reaction of Carbon Dioxide with Ethanolamines in Nonaqueous Solvents", AiChE Journal, 31(8), Aug 1985, 1297-1303.

D.J. Heldebrant et al., "CO2-binding organic liquids (CO2BOLs) for post-combustion CO2 capture", Energy Procedia, 1 (2009), 1187-95.

G.F. Versteeg et al., "On the Kinetics Between CO2 and Alkanolamines both in Aqueous and Non-Aqueous Solutions. An Overview", Chem. Eng. Comm., 144 (1996), 113-58.

G.F. Versteeg & W.P.M. Van Swaaij, "On the Kinetics Between CO2 and Alkanolamines Both in Aqueous and Non-Aqueous Solutions— I. Primary and Secondary Amines", Chemical Engineering Science, 43(3), 1988, 573-85.

R.A. Davis & O.C. Sandall, "Kinetics of the Reaction of Carbon Dioxide With Secondary Amines in Polyethylene Glycol", Chemical Engineering Science, 48(18), 1993, 3187-93.

J.E. Bara et al., "Gas Processing With Ionic Liquid-Amine Solvents", URS Corporation (Denver, Colorado), 2010.

M. Kim & J.-W. Park, "Reversible, solid state capture of carbon dioxide by hydroxylated amidines", Chem. Commun., 46 (2010), 2507-9.

E.J. Maginn et al., "Development of new post-combustion carbon dioxide capture solvents: Are ionic liquids the answer?", 235th ACS National Meeting, Apr. 6-10, 2008, Abstract.

S. Dinda et al., "Kinetics of Reactive Absorption of Carbon Dioxide and Solutions of Aniline in Nonaqueous Aprotic Solvents", Ind. Eng. Chem. Res., 45 (2006), 6632-9.

D. Camper et al., "Room-Temperature Ionic Liquid-Amine Solutions: Tunable Solvents for Efficient and Reversible Capture of CO2", Ind. Eng. Chem. Res., 47 (2008), 8496-8.

J.E. Bara et al., "Guide to CO2 Separations in Imidazolium-Based Room-Temperature Ionic Liquids", Ind. Eng. Chem. Res., 48 (2009), 2739-51.

J.A. Tossell, "Catching CO2 in a Bowl", Inorganic Chemistry, 48 (2009), 7105-10.

H. Zhou et al., "N-Heterocyclic Carbene Functionalized Polymer for Reversible Fixation—Release of CO2", Macromolecules, 42 (2009), 5419-21.

Y. Ito, "Formation of Carbamic Acids and Their Photochemistry", Kokagaku Kyokai, 33(3), 2002, 205-12. English Abstract only.

N. Imaishi et al., "Chemical absorption of carbon dioxide by non-aqueous solutions of cyclohexylamine", Kagaku Kogaku Robunshu, 7(3), 1981, 261-6. English Abstract only.

D. Wan et al., "Can Nonspecific Host-Guest Interaction lead to Highly Specific Encapsulation by a Supramolecular Nanocapsule?", Macromolecules, 42 (2009), 6448-56.

V.L. Yushko et al., "Effect of water content on the solubility of carbon dioxide in solutions of monoethanolamine in sulfolane", Voprosy Khimii i Khimicheskoi Tekhnologii, 30 (1973), 3-5. English Abstract only.

E. Sada et al., "Chemical Absorption of Carbon Dioxide into Ethanolamine Solutions of Polar Solvent", AIChE Journal, 32(2), Feb. 1986, 347-9.

K. Yogish "Absorption of CO2 in Some Hybrid Solvents", Can. J. Chem. Eng., 68 (1990), 511-2.

P.S. Kumar et al., "New absorption liquids for the removal of CO2 from dilute gas streams using membrane contactors", Chem. Eng. Sci., 57 (2002), 1639-51.

K. Takeshita & A. Kitamoto, "Relation between separation factor of carbon isotope and chemical reaction of carbon dioxide with amine in nonaqueous solvent", J. Chem. Eng. Japan, 22(5), 1989, 447-54. English Abstract only.

K. Takeshita & A. Kitamoto, "Chemical equilibria of absorption of carbon dioxide into nonaqueous solution of amine", J. Chem. Eng. Japan, 21(4), 1988, 411-7. English Abstract only.

G.F. Versteeg & W.P.M. Van Swaaij, "On the Kinetics Between CO2 and Alkanolamines Both in Aqueous and Non-Aqueous Solutions— II. Tertiary Amines", Chemical Engineering Science, 43(3), 1988, 587-91.

O.R. Rivas, "Solvent selectivity for the purification of natural gases", Ph.D. Thesis, U.C. Berkeley, 1978, Abstract.

S. Xu et al., "Kinetics of the Reaction of Carbon Dioxide with 2-Amino-2-methyl-1-propanol Solutions", Chem. Eng. Sci., 51(6), 1996, 841-50.

R.J. Littell et al., "Physical absorption into non-aqueous solutions in a stirred cell reactor", Chem. Eng. Sci., 46(12), 1991, 3308-13.

I.L. Leites et al., "Removal of carbon dioxide from gas by solutions of monoethanolamine in various diluents", Khimicheskaya Promyshlennost, 8 (1975), 599-602. English Abstract only.

K. Takeshita et al., "Separation of carbon isotopes by using the chemical reaction of carbon dioxide with amines in nonaqueous solution", Kagaku Kogaku, 55(6), 1991, 426-8. English Abstract only.

Y. Liang et al., "Unimolecular Micelle Derived from hyperbranched Polyethyleneimine with Well-Defined Hybrid Shell of Poly(ethylene oxide) and Polystyrene: A Versatile Nanocapsule", J. Polym. Sci., Pt. A: Polym. Chem., 48 (2010), 681-91.

E.D. Bates et al., "CO2 Capture by a Task-Specific Ionic Liquid", J. Am. Chem. Soc., 124(6), 2002, 926ff.

J.D. Holbrey et al., "1,3-Dimethylimidazolium-2-carboxylate: the unexpected synthesis of an ionic liquid precursor and carbene-0O2 adduct", Chem. Commun., 2003, 28-29.

F. Karadas et al., "Review on the Use of Ionic Liquids (ILs) as Alternative Fluids for CO2 Capture and Natural Gas Sweetening", Energy Fuels, 24 (2010), 5817-28.

W.D. McGhee et al., "Palladium-Catalyzed Generation of O-Allylic Urethanes and Carbonates from Amines/Alcohols, Carbon Dioxide, and Allylic Chlorides", Organometallics, 12 (1993), 1429-33.

T. Yamada et al., "Reversible, Room-Temperature Ionic Liquids. Amidinium Carbamates Dervied from Amidines and Aliphatic Primary Amines with Carbon Dioxide", Chem. Mater., 19 (2007), 967-9.

T. Yamada et al., "Reversible, Room-Temperature Chiral Ionic Liquids. Amidinium Carbamates Dervied from Amidines and Amino-Acid Esters with Carbon Dioxide", Chem. Mater., 19 (2007), 4761-8.

T. Yu et al., "Carbon Dioxide and Molecular Nitrogen as Switches between Ionic and Uncharged Room-Temperature Liquids Comprised of Amidines and Chiral Amino Alcohols", Chem Mater., 20 (2008), 5337-44.

E.R. Perez et al., "Activation of Carbon Dioxide by Bicyclic Amidines", J. Org. Chem., 69 (2004), 8005-11.

A.R. Katritzky et al., "The N-Carboxylic Acids of Nitrogen Heterocycles", Heterocycles, 26 (1987), 1333-44.

\* cited by examiner

Key to species of Figure 2 (Top)

Key to species of Figure 2 (Bottom)

$^{13}$C and $^1$H NMR spectra of 1:3 DEA:TMG in DMSO-$d_6$ solution before (top) and after (bottom) treatment with $CO_2$.

Key to species of Figure 3 (Top)

Key to species of Figure 3 (Bottom)

Key to species of Figure 4 (Top)

Key to species of Figure 4 (Bottom)

Vapor-Liquid Equilibrium of DMAE/TMG with $CO_2$ (Example 5).

ALKANOLAMINE CO₂ SCRUBBING PROCESS

ALKANOLAMINE $CO_2$ SCRUBBING PROCESS

CROSS-REFERENCE TO RELATED APPLICATIONS

This application claims the benefit of U.S. Provisional Application Nos. 61/421,048 filed Dec. 8, 2010, 61/420,960 filed Dec. 8, 2010, 61/420,978 filed Dec. 8, 2010, 61/381,281 filed Sep. 9, 2010, 61/381,294 filed Sep. 9, 2010, 61/381,351 filed Sep. 9, 2010, the entire contents of each of which are hereby incorporated by reference herein

FIELD OF THE INVENTION

This invention relates to the removal of carbon dioxide and other acid gases from a gaseous stream containing one or more of these gases. In particular, the invention relates to a method for separating an acid gas, e.g., carbon dioxide, from a gas mixture using one or more alkanolamines as the sorbent.

BACKGROUND

The removal of carbon dioxide from mixed gas streams is of great industrial importance and commercial value. Carbon dioxide is a ubiquitous and inescapable by-product of the combustion of hydrocarbons, and there is growing concern over its accumulation in the atmosphere and its potential role in a perceived global climate change. Laws and regulations driven by environmental factors may therefore soon be expected to require its capture and sequestration. While existing methods of $CO_2$ capture have been adequately satisfactory for the scale in which they have so far been used, future uses on the far larger scale required for significant reductions in atmospheric $CO_2$ emissions from major stationary combustion sources such as power stations fired by fossil fuels makes it necessary to improve the processes used for the removal of $CO_2$ from gas mixtures. According to data developed by the Intergovernmental Panel on Climate Change, power generation produces approximately 78% of world emissions of $CO_2$ with other industries such as cement production (7%), refineries (6%), iron and steel manufacture (5%), petrochemicals (3%), oil and gas processing (0.4%) and the biomass industry (bioethanol and bioenergy) (1%) making up the bulk of the total, illustrating the very large differences in scale between power generation on the one hand and all other uses on the other. To this must be added the individual problem of the sheer volumes of gas which will need to be treated: flue gases consist mainly of nitrogen from combustion air, with the $CO_2$, nitrogen oxides and other emissions such as sulfur oxides making up relatively smaller proportions of the gases which require treatment: typically, the flue gases from fossil fuel power stations typically contain from about 7 to 15 volume percent of $CO_2$, depending on the fuel, with natural gas giving the lowest amounts and hard coals the greatest.

Cyclic $CO_2$ absorption technologies such as Pressure Swing Absorption (PSA) and Temperature Swing Absorption (TSA) using liquid absorbents are well-established. The absorbents mostly used include liquid solvents, as in amine scrubbing processes, although solid sorbents are also used in PSA and TSA processes. Liquid amine absorbents, including alkanolamines, dissolved in water are probably the most common absorbents. Amine scrubbing is based on the chemical reaction of $CO_2$ with amines to generate carbonate/bicarbonate and carbamate salts: the aqueous amine solutions chemically trap the $CO_2$ via formation of one or more ammonium salts (carbamate/bicarbonate/carbonate) which are thermally unstable, enabling the regeneration of the free amine at moderately elevated temperatures. Commercially, amine scrubbing typically involves contacting the $CO_2$ and/or $H_2S$ containing gas stream with an aqueous solution of one or more simple amines (e.g., monoethanolamine (MEA), diethanolamine (DEA), methyldiethanolamine (MDEA) or triethanolamine (TEA)). The low molecular weight of MEA makes it economically attractive because sorption takes place on a molecular basis while the amine is sold on a weight basis. The cyclic sorption process requires high rates of gas-liquid exchange, the transfer of large liquid inventories between the absorption and regeneration steps, and high energy requirements for the regeneration of amine solutions. It is challenged by the corrosive nature of the amine solutions containing the sorbed $CO_2$. Without further improvement, these difficulties would limit the economic viability of the aqueous amine scrubbing processes in very large scale applications.

The cyclic absorption processes using aqueous sorbents require a large temperature differential in the gas stream between the absorption and desorption (regeneration) parts of the cycle. In conventional aqueous amine scrubbing methods relatively low temperatures, e.g., less than 50° C., are required for $CO_2$ uptake with an increase to a temperature to above about 100° C., e.g., 120° C., required for the desorption. The heat required to maintain the thermal differential is a major factor in the cost of the process, and with the need to regenerate the solution at temperatures above 100° C., the high latent heat of vaporization of the water (2260 kJ/Kg at 100° C.) obviously makes a significant contribution to the total energy consumption. In addition, the low molecular weight amines commonly used in the liquid process suffer significant amine loss due to vaporization in the temperature swing process. If $CO_2$ capture is to be conducted on the larger scale appropriate to use in power stations, more effective and economical separation techniques need to be developed.

Another area where more efficient $CO_2$ separation processes are used is in enhanced oil recovery (EOR) where $CO_2$ is re-injected into the gas or liquid hydrocarbon deposits to maintain reservoir pressure. With the advanced age of many producing reservoirs worldwide and the ever-increasing challenge of meeting demand, the expanding use of EOR methods is becoming more widespread. Typically the source of carbon dioxide for EOR is the producing hydrocarbon stream itself, which may contain anywhere from less than 5% to more than 80% of $CO_2$. Other options are to capture $CO_2$ from the flue gases of various combustion sources and pre-combustion capture of $CO_2$ from shifted syngas produced in fuel gasification processes.

Various commercial $CO_2$ capture processes have been brought to market. The Fluor Daniel Econamine™ Process (originally developed by Dow Chemical and Union Carbide), which uses MEA for recovery of $CO_2$ from flue gases, primarily for EOR applications, has a number of operational plants. The Benfield™ Process using hot potassium carbonate is used in many ammonia, hydrogen, ethylene oxide and natural gas plants with over 675 units worldwide licensed by UOP and has been proposed for treating flue gas, notwithstanding its minimum $CO_2$ partial pressure requirement of 210-345 kPag (30-50 psig). One significant disadvantage of the Benfield Process is its use of a high temperature stripping step (175° C.) approximately 75-100° C. above the temperature of the absorption step. The Catacarb™ process, also using hot potassium carbonate, also uses high temperature stripping resulting in high energy consumption.

Processes using sterically hindered amines as alternatives to MEA, DEA, and TEA have also achieved success, including the ExxonMobil Flexsorb™ Process and the KS™ Process from Mitsubishi Heavy Industries and Kansai Electric Power Co.

Processes using solid absorbents are also known, and, while they may avoid many of the limitations of amine scrubbing, solid chemical sorbents are generally challenged by poor mass and heat transfer properties, whereas solid physical sorbents suffer from a lack of sufficiently selective $CO_2$ absorption under the humid conditions present in most commercial combustion flue gas processes.

In the design of a practical $CO_2$ capture process, a number of issues need to be considered, including:
(i) The efficiency of the capture process in terms of relative amount of absorbent required,
(ii) The efficiency of the capture process in terms of energy required for absorption/desorption, and
(iii) Corrosion factors.

These issues are, of course, directly affected by the chemistry of the sorption process. The efficiency of chemisorption processes such as the conventional amine scrubbing processes is dependent in part by the ability of the absorbent medium to react with the CO2. In conventional aqueous amine systems, the process by which $CO_2$ is absorbed by amines is believed to proceed by the gaseous $CO_2$ dissolving in water to form $H_2CO_3$, which is neutralized by the amine to form an ammonium bicarbonate. Depending on pH, the ammonium bicarbonate may then react with a second mole of amine to form an ammonium carbonate. Primary and secondary amines may also react directly with the $CO_2$ to form an ammonium carbamate which is itself stable in the presence of water and may be present as a significant reaction product, especially at high amine concentration. Further reaction of the carbamate with water may lead to a final bicarbonate product with a 1:1 $CO_2$:amine ratio, or to a carbonate product with a 1:2 $CO_2$:amine ratio (depending on solution pH). Thus, the conventional amine processes are limited to a sorption efficiency which in principle, has a maximum $CO_2$:amine ratio of 1:1. Further improvements in the capture ratio and thus the efficiencies and scaleabilities of related processes are desirable.

SUMMARY OF THE INVENTION

We have now found that it is possible to enhance $CO_2$ uptake efficiencies in an alkanolamine scrubbing process by using the alkanolamine sorbents in combination with a strong, non-nucleophilic base as a second reaction component. Analysis has shown that the pathway for the increased $CO_2$ uptake can proceed by nucleophilic addition of $CO_2$ at both the hydroxyl oxygen and amine nitrogen atoms of the alkanolamine. The reaction products from the chemical reaction between the $CO_2$ and the alkanolamine/base combination may be decomposed by thermal treatment and/or by $CO_2$ partial pressure reduction to liberate the $CO_2$ and to regenerate the sorbent for acid gas scrubbing operations.

According to the present invention, a $CO_2$ alkanolamine scrubbing process can use a combination of one or more alkanolamine $CO_2$ sorbent(s) with a second, non-nucleophilic base that can be more strongly basic, in terms of pKa, than the alkanolamine(s). The secondary base can act to promote the reaction between the $CO_2$ and the alkanolamine, preferably at both the hydroxyl oxygen and the available amine nitrogen sites on the alkanolamine. In principle, the process has the capability to take up $CO_2$ at each amine site, as well as at each oxygen in the alkanolamine, so that the alkanolamine can function with a high sorption efficiency.

The process can normally be operated in a cyclic manner with a liquid absorbent comprising the alkanolamine and secondary base promoter circulating between a sorption zone, typically a sorption tower, and a regeneration zone, again typically in the form of a tower. The process can comprise:
(i) contacting the gas stream in a sorption zone with a liquid absorbent comprising at least one alkanolamine $CO_2$ sorbent and a non-nucleophilic base having a pKa higher than that of the alkanolamine to sorb $CO_2$ by chemisorption,
(ii) passing the liquid absorbent containing the sorbed $CO_2$ to a desorption zone to liberate $CO_2$ from the $CO_2$-containing absorbent liquid and regenerate the absorbent liquid by treating the absorbent containing the sorbed $CO_2$ under conditions sufficient to cause desorption of at least a portion of the $CO_2$, from the absorbent, and
(iii) returning the absorbent liquid from which the $CO_2$ has been liberated to the sorption zone.

DETAILED DESCRIPTION

The separation process of the present invention involves removing $CO_2$ and/or other acid gases, such as $H_2S$, from a gas stream containing one or more of these gases using a liquid sorbent medium which comprises a combination of at least two bases of differing relative basicities. One component comprises one or more alkanolamines and the second basic component comprises one or more relatively stronger, non-nucleophilic nitrogenous bases. The stronger base component may itself be effective to sorb $CO_2$ and it can therefore be regarded a co-sorbent as well as a promoter for the amine component. One way of carrying out the sorption process is to operate with a liquid sorption medium comprising the amine and the secondary base with or without a solvent. In this variant, the sorption is generally carried out in a sorption zone, typically, a sorption tower in a cyclically operating unit, to produce an effluent gas stream which has a reduced concentration of the absorbed component relative to the entering gas mixture. The sorbed component is normally desorbed and the sorbent medium regenerated by altering the conditions so as to favor desorption, usually by increasing the temperature of the sorbent medium, decreasing the pressure or by gas stripping, typically with an inert (non-reactive) gas or a natural gas stream, in a regeneration tower. Under the selected desorption conditions, the sorbed component is purged from the selective absorbent and is sent to utilization or sequestration.

Cyclic Sorption Unit

Figure 1:
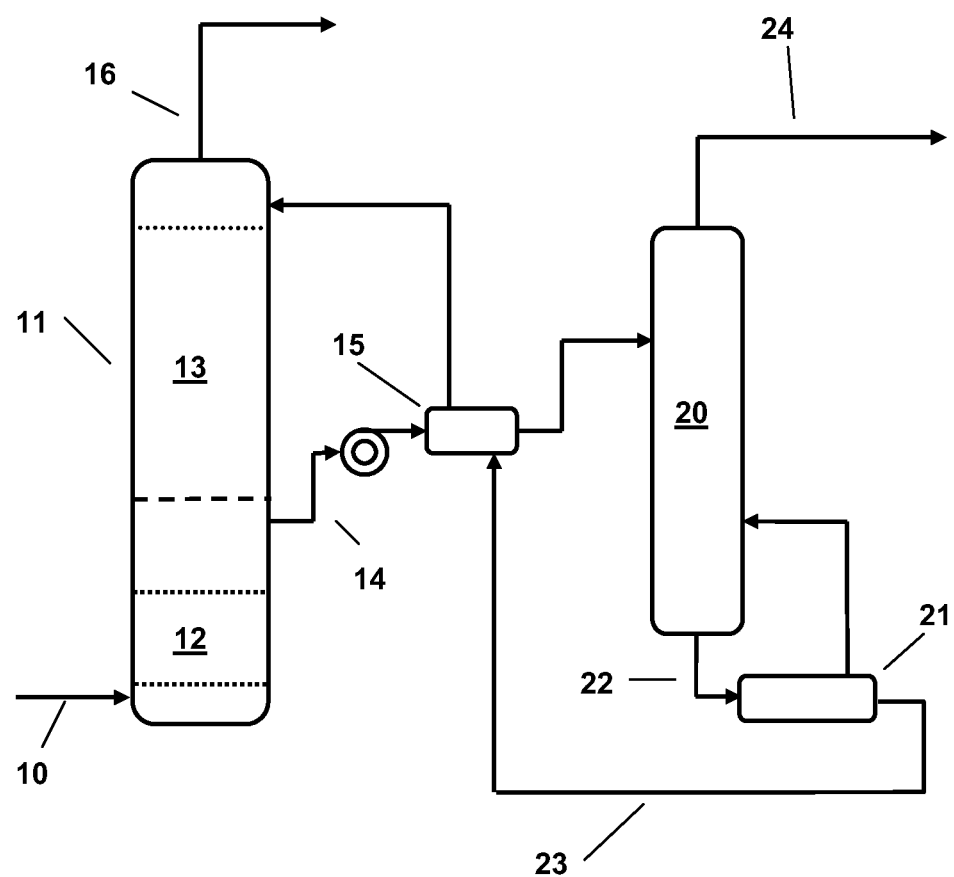
FIG. 1 is a simplified schematic of a cyclic separation unit suitable for separating $CO_2$ from a flue gas stream.

FIG. 1 shows a simplified schematic of a continuous cyclic gas separation unit which may be used for separating $CO_2$ from flue gas streams, natural gas streams, and other streams using the basic absorbent medium. The hot flue gas stream enters the unit by way of line 10, entering at the foot of absorber tower 11, and passing through cooling section 12, in which its temperature is reduced by direct or indirect cooling. Cooling is also effective to reduce the water content, if desired, of the gas stream. If the cooling step is not required, the gas may be passed directly into sorption section 13.

In sorption section 13, the gas passes in countercurrent contact with a descending stream of the liquid sorbent medium. The $CO_2$ along with any other gases which are amenable to absorption in the solution are taken up and the "rich" solution 14 containing the sorbed $CO_2$ is removed with a separation tray (not shown) at the lower end of the sorption section. The rich solution 14 then passes through heat exchanger 15 to desorption/regeneration tower 20, in which the $CO_2$ and other gases are desorbed; in this case, by an increase in temperature with agitation being provided by the stream of desorbed $CO_2$ or purge gas. The rich solution enters the tower at a level appropriate to its composition and passes downwards as dissolved gases are removed. Heat for the regeneration tower is supplied by reboiler 21 which circulates a slipstream of solution taken from the foot of the regeneration tower by way of line 22. A stream of regenerated lean solution with a lower equilibrium level of $CO_2$ is taken from the reboiler in line 23 to pass through the other side of heat exchanger 15 before re-entering absorber tower 11 for passage through the gas stream. The gas stream purged of dissolved $CO_2$ passes out of absorber tower 11 through line 16 and the desorbed $CO_2$ and other acid gases removed from the original gas stream are removed in concentrated form through line 24 and taken to final sequestration or utilization, e.g., in industry or in enhanced oil recovery.

Conventional equipment can be used to perform the various functions of the cyclic scrubbing process, such as monitoring and automatically regulating the flow of gases so that it can be fully automated to run continuously in an efficient manner.

Gas Stream

The gas streams which are particularly amenable to treatment by the present sorption process are flue gas from the combustion of carbonaceous fuels and natural gas from subterranean sources. Flue gas may originate from the combustion of carbon-containing fossil fuels such as natural gas, lignite coals, sub-bituminous coals, bituminous coals, and anthracite coals. Its $CO_2$ content may typically vary from about 6 to 15 weight percent depending on the fuel, with the highest levels coming from hard coal combustion and the lowest from natural gas. Natural gas streams containing carbon dioxide may contain, in addition to methane and carbon dioxide, one or more other gases such as ethane, n-butane, i-butane, hydrogen, carbon monoxide, ethene, ethyne, propene, nitrogen, oxygen, helium, carbonyl sulfide, hydrogen sulfide, and the like, as well, in some cases, mercury contaminants if they have not been removed by other pre-treatment. Other streams which can be treated by the present separation process include syngas and shifted syngas produced in fuel gasification processes and gas streams from petrochemical plants whose composition will naturally depend on the process from which they are derived. Water is likely to be present both in flue gases and in natural gas from combustion of hydrocarbon fuels or from contact with ground waters. Although the present process can accept water in the entering gas stream, as described below, removal of substantial quantities may be desirable, for example, by treatment with a drying agent or by cooling to condense and thereby reduce the water content.

Absorption Process

The efficiency of the $CO_2$ sorption is directly affected by the chemistry of the process. In conventional aqueous alkanolamine systems, the process by which $CO_2$ is absorbed by amines is driven by acid-base chemistry occurring at the amine sites of the alkanolamine. The hydroxyl groups are generally considered inert and play no direct role in the sorption except possibly to improve solubility of the alkanolamine and the $CO_2$ adduct in the water. The essential features of the sorption sequence at the amine sites are nucleophilic attack of a Lewis base (amine nitrogen) at a Lewis acid ($CO_2$), and subsequent proton transfer from a Brønsted acid (the resultant zwitterion/carbamic acid described below) to a Brønsted base (a second mole of the amine), forming an ammonium carbamate product. In the absence of a sufficiently nucleophilic amine, or in the case of a tertiary amine lacking a transferable proton, the water oxygen acts as the nucleophile forming a Brønsted acid, $H_2CO_3$ (gas phase $CO_2$ dissolution in water), which is neutralized by the alkanolamine acting as a Brønsted base to form an ammonium bicarbonate. At high pH, the ammonium bicarbonate may then react with a second mole of amine to form an ammonium carbonate. In all cases, the chemistry proceeds via nucleophilic attack (primary or secondary amine nitrogen, or water oxygen) at the $CO_2$ carbon, followed by proton transfer ultimately to an amine acceptor. The ammonium carbamate product that initially forms with primary and secondary amine groups is itself stable in the presence of water and may be present as a significant reaction product, especially at high alkanolamine concentration. Nonetheless, subsequent reaction of the carbamate with water may lead to a final bicarbonate product. The conventional aqueous process is based on fast carbamate formation with very small amounts of bicarbonate.

In non-aqueous systems, primary and secondary amines react as described above to yield ammonium carbamate products; tertiary amines are unreactive. As shown below, the initial nucleophilic attack forms a zwitterion intermediate which is unstable and rapidly decomposes via internal proton transfer to the carbamic acid. Carbamic acids are Brønsted acids that can react with a second amine group to form an ammonium carbamate. Both the zwitterions and the carbamic acids are unstable and it is not known which equilibrium form undergoes further reaction, although it is posited that it is the carbamic acid which may be deprotonated by a second amine equivalent to produce the ammonium carbamate salt with the overall stoichiometric requirement of two amines per mole of carbon dioxide absorbed (0.5:1 $CO_2$:amine group). This pathway is also found in aqueous systems at early reaction stages, although there is a different carbamate-carbamic acid equilibrium in non-aqueous systems, Finally, in aqueous systems there exists the possibility of further reaction with water to form bicarbonate and carbonate, as described above.

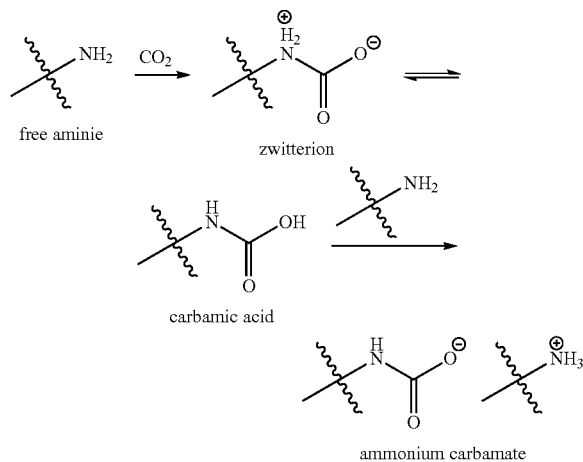

This chemistry requires the amine to function as both an effective nucleophile (Lewis base) in its attack on the $CO_2$ and a proton acceptor (Brønsted base) in its reaction with the carbamic acid to form the ammonium carbamate. These two types of basicity are, however, different in that Lewis acid-base reactions involve electron transfer, while Brønsted acid-base involves proton transfer. A strong Brønsted base may not necessarily be a strong Lewis base, and vice versa. Both the internal proton transfer to form the carbamic acid and the subsequent acid-base reaction to form the carbamate product, would be expected to be rapid.

Base Promoted Alkanolamine $CO_2$ Chemisorption

The current invention utilizes a new approach to significantly increase the $CO_2$ uptake efficiency of alkanolamines. In the presence of a strong, non-nucleophilic Brønsted base (proton acceptor), both protonated nucleophilic sites (O—H and N—H) are activated for reaction with $CO_2$ to form alkylcarbonate and carbamate products, respectively. In addition, the alkanolamine/strong Brønsted base combination is capable of promoting the formation of dicarbamate species at primary amine sites, as shown in exemplary fashion by the following equations:

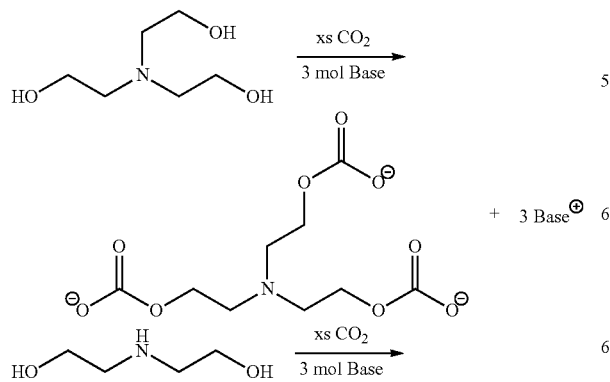

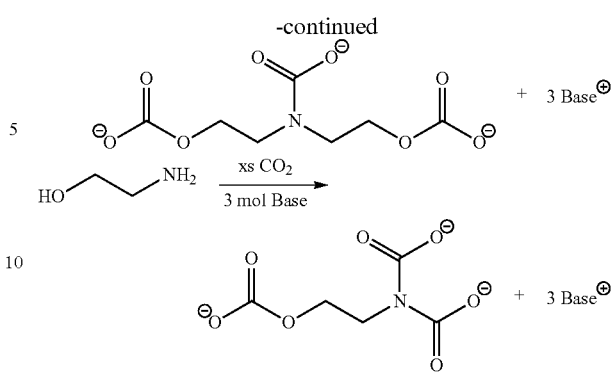

In all of the above reactions, all available O—H bonds undergo carbonation by $CO_2$ to form alkylcarbonate anions that are charge-balanced by the protonated form of the non-nucleophilic strong Brønsted base. Similarly, all available N—H bonds undergo carboxylation to form carbamate anions that are also charge-balanced by the protonated form of the non-nucleophilic strong Brønsted base. Thus in each case, full carbonation at the O—H sites and full carboxylation at the N—H sites is made possible by the strong proton acceptance of the Brønsted base. This full utilization of the nucleophilic sites of the alkanolamines, increases their total $CO_2$ sorption capacity beyond that achieved in the prior art. As indicated by the third equation above, a reaction of two moles of $CO_2$ at each nucleophilic primary amine site is possible in the presence of the secondary base, thus making the use of alkanolamines with primary amino groups such as ethanolamine attractive.

By using alkanolamines such as monoethanolamine (MEA), diethanolamine (DEA), and triethanaolamine (TEA) as shown above, the possibility of forming reaction products with 3:1 $CO_2$:alkanolamine stoichiometry is created, which is at least three times higher on a molar basis than the $CO_2$ loading achieved in current commercial reactors (1:2 $CO_2$: alkanolamine in case of MEA). This approach can be extended to other alkanolamines including N-methyl diethanolamine ($CH_3N(C_2H_4OH)_2$, (MDEA)), hydroxyethyl-ethylenediamine, and others. If the structure has more than three potentially nucleophilic sites, the potential for even higher $CO_2$:alkanolamine stoichiometry may exist although possibly not fully realized in practice. The temperature stability of these reaction products (e.g., absorption/desorption temperature) is generally lower than the stability of regular and mixed carbamates and can be fine-tuned by varying the electronic effects and thereby the nucleophilicity of the alcohol group and the non-nucleophilic nitrogenous base. Reduction of regeneration energy may be considered a benefit of these alkanolamine/base mixtures.

While alkanolamines alone are highly effective in the $CO_2$ capture process, they are incapable of undergoing O-carbonation at the hydroxyl sites. The use of the secondary, non-nucleophilic, strong Brønsted base effectively promotes the oxygen carbonation reaction and may also act as a solvent in the sorbent medium.

As shown in the above equations, a mechanism involving reaction of one $CO_2$ molecule at each of the oxygens in the alkanolamine in addition to reaction at primary and secondary amine sites is posited. The nucleophilic OH group(s) will attack the C═O group of $CO_2$ to form an intermediate alkylcarbonic acid species while nucleophilic attack onto the $CO_2$ by the primary and secondary amine sites can take place in a similar fashion to form an intermediate carbamic acid/Zwitterion species which is in fast internal equilibrium with itself. The secondary, non-nucleophilic base promotes the overall formation of the alkylcarbonate at the oxygens and carbamate species at the nitrogens, by a mechanism which is hypothesized as deprotonation of the intermediate species with the secondary base acting in the role of a Brønsted base (proton acceptor).

A further advantage of this invention is that the resulting carbamate/alkylcarbonate products are expected to be less stable than regular carbamates as the carbonate groups may decompose first at lower temperature. This may allow decomposition of the reaction products and regeneration of $CO_2$ at lower temperatures, saving regeneration energy. The stability of the resulting carbamate/alkylcarbonate products can be tuned by varying the nucleophilicity of the alcohol group and the basicity of the secondary base. Tailoring the energetics and kinetics of an acid gas scrubbing process is possible using various alkanolamine/non-nucleophilic strong base combinations (e.g., guanidines, biguanidines, triazabicyclodecenes, amidines, imidazolines, pyrimidines).

Alkanolamines

The nucleophilic (Lewis base) function for the initial reaction with the $CO_2$ is provided in the present process by an alkanolamine, i.e., compounds containing one or more hydroxyl groups and one or more primary, secondary or tertiary amino groups. Substituent groups on the nitrogen(s) may include other groups besides hydroxyalkyl, for example, alkyl, aralkyl, substituted alkyl, or substituted aralkyl. Alkanolamines which therefore fall for consideration include compounds such as monoethanolamine (MEA), diethanolamine (DEA), triethanolamine (TEA) methyldiethanolamine (MDEA), diglycolamine (DGA), 2-amino-2-methyl-1-propanol (AMP), 2-(2-aminoethylamino)ethanol (AEE-HOC$_2$H$_4$NHC$_2$H$_4$NH$_2$, also known as hydroxyethyl-ethylenediamine, HEEDA), 2-amino-2-hydroxymethyl-1,3-propanediol (Tris), diisopropanolamine (DIPA) and ethoxyethanol-tertiarybutylamine (EETB).

Secondary Base

In addition to the alkanolamine, the sorbent medium also contains one or more non-nucleophilic, more strongly basic compounds which provide the Brønsted base function in the reaction to form the carbamate and alkylcarbonate salts. This class of bases is represented generally by the non-nucleophilic, nitrogenous bases having a pKa (as measured or predicted at 25° C. in aqueous solution or as measured in another solvent and converted to an aqueous value) higher than that of the amine functionality of the alkanolamine. The secondary base will typically have a p$K_a$ value of at least 9.0 although higher values of at least 10.0 or 11.0, preferably at least 12.0, and more preferably at least 13.0 are favored for optimal promotion of the O-carbonation reaction. A useful means of making an adequate prediction of the p$K_a$ value of the base may be provided by the ACD/PhysChem Suite (a suite of software tools for the prediction of basic physicochemical properties including p$K_a$), available from Advanced Chemistry Development, Inc., 110 Yonge Street, Toronto, Ontario, Canada M5C 1T4. Exemplary p$K_a$ values for a limited number compounds (in dimethylsulfoxide) may be found in the Bordwell online p$K_a$ database, http://www.chem.wisc.edu/areas/reich/pkatable/index.htm.

The strong base should be basic enough to influence the equilibrium towards the carbamate and alkylcarbonate products effectively, but on the other hand, not so strong that it stabilizes these products to the point that the reaction sequence becomes irreversible and desorption of the $CO_2$ becomes difficult or infeasible, e.g., by an uneconomically high temperature requirement. Bases which are not acceptable are those that precipitate from the sorbent solution, or species that may influence the reaction chemistry of $CO_2$ (e.g., hydroxide bases that form water upon protonation). The base should preferably also lack the propensity to act as a competing nucleophile towards $CO_2$ under the conditions of the sorption process although some degree of nucleophilicity may be tolerated.

Non-nucleophilic nitrogenous bases which may be used to promote the O-carbonation and N-carboxylation reactions includes cyclic, multicyclic, and acyclic structures, such as imines, heterocyclic imines and amines, amidines (carboxamidines) such as dimethylamidine, guanidines, triazabicyclodecenes, imidazolines, and pyrimidines, including the N,N-di(lower alkyl) carboxamidines where lower alkyl is preferably C1-C6 alkyl, N-methyltetrahydropyrimidine (MTHP), 1,8-diazabicyclo[5.4.0]-undece-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), substituted guanidines of the formula $(R^1R^2N)(R^3R^4N)C=N-R^5$ where $R^1$, $R^2$, $R^3$ and $R^4$ are preferably lower alkyl ($C_1$-$C_6$) and $R^5$ is preferably H or lower alkyl ($C_1$-$C_6$), such as 1,1,3,3-tetramethylguanidine and biguanidines. Other substituent groups on these compounds such as higher alkyl, cycloalkyl, aryl, alkenyl, and substituted alkyl and other structures may also be used.

The reaction of the $CO_2$ with the reactive hydroxyl oxygens and the N—H sites of the amino group nitrogens is, as shown by the equations above, stoichiometric with one mole of the secondary base needed to form the carbamate or alkylcarbonate entity at each of the reactive hydroxyl or amine sites on the alkanolamine. The secondary base will therefore preferably be used on a 1:1 nucleophile equivalent basis (moles base relative to the sum of each reactive (nucleophilic) hydroxyl group and each proton on the nucleophilic amine group(s) of the alkanolamine). So, for example, in the case of monoethanolamine with one reactive hydroxyl oxygen and two protons on the primary amino group capable of participating in nucleophilic reactions with the $CO_2$, at least three moles of the secondary base should be used per mole of ethanolamine. Similarly, a 3:1 minimum ratio is appropriate for triethanolamine (three reactive oxygens, (one non-nucleophilic amino nitrogen). Diethanolamine with its two hydroxyl oxygens and one nucelophilic amino nitrogen should use a minimum molar ratio to the secondary base of 3:1. With N-methyldiethanolamine, there are no non-nucelophilic amino nitrogens on the tertiary amine site but two potentially reactive hydroxyl oxygens and in this case, a molar ratio of at least 2:1 is appropriate. The secondary base may, however, be used in excess if capable of reacting with the $CO_2$ alone or desired for its use as a solvent. Although it is in principle, possible to use less than one molar equivalent of non-nucleophilic base per amine site to generate the final carbamate product since the intermediate products present in the carbamic acid form of the carbamic acid/carbamate equilibrium are neutral and thus do not require a counterion for the formation of the final carbamate, it has been found that the formation of the O-carbonated species increases and approaches 100% with higher ratios of secondary base to alkanolamine, typically in the range of 3:1 or 4:1. Generally, therefore, the relative amount of the secondary base will be more than the minimum of 1 molar equivalent of strong base per reactive alkanolamine site, e.g. 2:1 or higher, if the full potential chemisorption capacity of the alkanolamine is to be achieved. Due allowance for the relative proportions of hydroxyl and nucelophilic amine sites should be made in setting the ratio of secondary base to alkanolamine.

Solvent

The alkanolamine/base mixture may be used as the neat liquid sorbent material provided that it remains sufficiently liquid to be pumped and handled in the unit; with a molar excess of the secondary non-nucleophilic base normally being used in order to promote the carbonation/carboxylation reaction at each of the nucleophilic sites on the alkanolamine, the secondary base will normally function as a solvent or co-solvent for the alkanolamine. The existence of the multiple potential reaction sites on the alkanolamine will, however, create the potential for the production of $CO_2$ sorption products in the form of gels with relatively high molecular weights and viscosities; strong intermolecular interactions may also increase the viscosity of the sorbent medium. It may therefore become desirable to use a solvent to control the viscosity of the sorbent medium so that it may circulate readily in the unit: the concentration of the alkanolamine/base in the solvent may be adjusted to maintain the desired solution viscosity as needed, particularly for the rich solution containing the sorbed $CO_2$.

The beneficial aspects of this invention can be obtained in both aqueous and non-aqueous solvents, however more polar, non-aqueous, aprotic solvents may be preferred in some embodiments. Polar solvents may be capable of solvating the reaction products better as compared to solvents of lower polarity and so minimize the tendency to form dimers in solution. A polar solvent can also increase the physical absorption of $CO_2$ in solution, thereby facilitating increased loading and capacity of the absorbent. These benefits are fully expected in water, with the additional benefit of enabling bicarbonate formation with tertiary alkanolamines. Thus, an aqueous solution of a 1:3 molar ratio of TEA and the non-nucleophilic strong base, has the potential to capture four moles of $CO_2$, three via O-carbonation to form alkylcarbonate anions charge balance by three moles of protonated strong base, and a fourth mole by bicarbonate anion charge balanced by the protonated tertiary amine site. The bicarbonate formed at the tertiary amine site is less stable and therefore preferred, to that which would be expected to form directly with the non-nucleophilic strong base in water. In addition, the use of aqueous alkanolamine solutions enables the present process to be readily adapted to application in existing commercial aqueous amine scrubbing units.

Non-aqueous polar solvents would be expected to be less corrosive, enabling the use of cheaper metallurgies, e.g., carbon steel, with reduced concern about corrosion at higher loadings.

A solvent such as toluene with a relatively low dipole moment may be found to be effective although in general, higher values for the dipole moment (Debye) of at least 2 and preferably at least 3 are to be preferred. Polar solvents such as DMSO (dimethyl sulfoxide), DMF (N,N-dimethylformamide), NMP (N-methyl-2-pyrrolidone), HMPA (hexamethylphosphoramide), THF (tetrahydrofuran) and the like are preferred.

The preferred solvents preferably have a boiling point of at least 65° C. and preferably 70° C. or higher in order to reduce solvent losses in the process and higher boiling points are desirable depending on the regeneration conditions which are to be used. Use of higher boiling point solvents will conserve valuable energy which would otherwise be consumed in vaporization of the solvent.

Solvents which have been found effective to various extents include toluene, sulfolane (tetramethylene sulfone) and dimethylsulfoxide (DMSO). Other solvents of suitable boiling point and dipole moment would include acetonitrile, N,N-dimethylformamide (DMF), tetrahydrofuran (THF), N-methyl-2-pyrrolidone (NMP), propylene carbonate, dimethyl ethers of ethylene and propylene glycols, ketones such as methyl ethyl ketone (MEK), esters such as ethyl acetate and amyl acetate, and halocarbons such as 1,2-dichlororobenzene (ODCB). Dipole moments (D) and boiling points for selected solvents are:

|  | Dipole Moment, (D) | B.P., (° C.) |
|---|---|---|
| Toluene | 0.36 | 110.6 |
| Sulfolane | 4.35 | 285 |
| DMSO | 3.96 | 189 |
| DMF | 3.82 | 153 |
| MEK | 2.78 | 80 |
| Acetonitrile | 3.92 | 81 |
| THF | 1.63 | 66 |
| ODCB | 2.50 | 180.5 |

Another possibility is to use an ionic liquid as the solvent as an amine solvent in the associated $CO_2$ sorption processes. The ionic liquids may themselves act as useful chemisorbents for $CO_2$ under the conditions contemplated for use in the present process and may therefore be useful in this adjunct role. Many of them are nonflammable, non-explosive, and have high thermal stability. They are also recyclable, which can be helpful in reducing environmental concerns over their use.

A class of ionic liquids which has been found to be useful as amine solvents and $CO_2$ chemisorbents are the imidazolium, benzimidazolium, imidazolidinium (4,5-dihydro-1H-imidazolium) and thiazolium salts. The preferred anions for forming salts with these cations are those in which the conjugate acid of the counterion has a $pK_a$ as measured or predicted at 25° C. in aqueous solution (or as measured in other solvent and converted to an aqueous value, referred to as aqueous equivalent scale) of at least 0 and more preferably of at least 2.0 or even as high as 4.0 or more. The anion of the ionic liquid salt will affect its ability to act as an agent for $CO_2$ capture, with more basic anions such as acetate and thiocyanate enhancing chemisorption and less basic anions such as chloride being less effective. The imidazolium salts which have been found to function well as amine solvents and chemisorbents for the $CO_2$ are the 1,3-dialkyl substituted imidazolium salts with preference for the acetate salts as exemplified by 1-ethyl-3-methyl imidazolium acetate and 1-butyl-3-methyl imidazolium acetate, but other salts may be considered, such as those with halide, thiocyanate, or lower alkyl chain carboxylate anions.

Once the absorbent medium has been formulated with amine/base combination and the solvent, optionally with ingredients such as antioxidants, corrosion inhibitors, and the like, it can be employed, for example, in an absorption unit, as illustrated in outline in FIG. 1.

The concentration of the alkanolamine, secondary non-nucleophilic nitrogenous base and solvent can vary over a wide range, usually from 5 or 10 weight percent to 90 weight percent for the alkanolamine/base in the solvent. Since the sorption temperature and pKa of the alkanolamine and strong base may also play into the reaction equilibrium, the optimal concentration may be determined empirically taking this into account along with sorbent viscosity and other factors. In general, the total alkanolamine/base concentration in the solvent will preferably be from about 10 weight percent to about 50 weight percent, or even lower, for example from 10 to 30 weight percent.

The formation of precipitates is regarded as generally undesirable since, if precipitates are formed, the concentration of the active alkanolamine sorbent decreases and the amount of amine available for $CO_2$ capture, decreases accordingly even though the characteristic electronegative oxygens in the alkanolamines tends to make the $CO_2$ reaction products more soluble.

Solid Phase Operation

While the present process is suited to operation in the liquid phase, the same chemistry can also be conducted in the pores or on the surface of a porous, solid support. This may involve impregnating a solution of the alkanolamine and non-nucleophilic strong base into a porous support, or chemically grafting one or both of the alkanolamine and strong base onto the surface of the support by chemical reaction between the support material and the alkanolamine and/or base. Alternatively, a precursor of the alkanolamine and/or base may be used or a reactive compound containing the alkanolamine/base groups required for participation in the carbonation/carboxylation reactions. Common support materials include carbon (activated charcoal) as well as porous solid oxides of metals and metalloids and mixed oxides, including alumina, silica, silica-alumina, magnesia and zeolites. Porous solid polymeric materials are also suitable provided that they are resistant to the environment in which the sorption reaction is conducted. Discounting the presence of significant solvent effects in achieving the $CO_2$ uptake in the liquid phase, the same chemistry will be applicable with the alkanolamine and non-nucleophilic strong base on the solid support in the presence of $CO_2$. Regeneration, in this case, would be achieved by operating in a temperature swing sorption mode by heating the solid containing the sorbed $CO_2$ to decompose the $CO_2$/mixed base reaction products on the support surface to release the sorbed $CO_2$. Heating can conveniently be accomplished by passing a heated gas stream through the bed of solid sorbent, usually in countercurrent to the direction of the initial gas stream; the purge gas may be supplied using a slipstream from the purified gas stream. In this way energy savings may be achieved by avoiding the necessity of heating large volumes of solution.

As the components of the gas stream have relatively small molecular dimensions, the minimum pore size of the support is not in itself a severely limiting factor but when the basic nitrogenous compounds are impregnated, the entrances to the pore systems of small and intermediate pore size zeolites may become occluded by bulky alkanolamine/base component(s) and for this reason, are not preferred, especially with the bases of relatively larger molecular dimensions. In order to minimize diffusion limitations, especially with bulky alkanolamine and/or base components, the preferred porous solid support materials have relatively large pore sizes, with the mesoporous and macroporous materials being most suitable. Large pore size zeolites may be suitable depending on the dimensions of the amine and the secondary base. Amorphous porous solids with a range of different pore sizes are likely to be suitable since at least some of the pores will have openings large enough to accept the basic component(s) and then to leave sufficient access to the components of the gas stream. Supports containing highly acidic reaction sites as with the more highly active zeolites are more likely to be more susceptible to fouling reactions upon reaction with the nitrogenous compound than less acidic species are therefore less likely to be preferred.

A preferred class of solid oxide support is constituted by the mesoporous and macroporous materials (as defined by IUPAC), for example, the silica compounds of the M41S series, including MCM-41 (hexagonal) and MCM-48 (cubic) and other mesoporous materials such as SBA-15.

Sorption/Desorption Conditions

For absorption, the temperature is typically in the range of from about 20° C. to about 90° C., preferably from about 30° C. to about 70° C. Although some mixed base (alkanolamine plus secondary base) systems may possess the capability to sorb $CO_2$ effectively at temperatures above about 50° C. and even as high as about 90° C. (with a preferred maximum of about 70° C.), the stability of the mixed alklanolamine/base reaction products may permit operation of the sorption portion of the cycle at relatively low temperatures, near ambient or just above ambient, typically from 15 to 70° C. and preferably from 20 to 50° C.

The pressure during the sorption step is typically in the range of from about 0.1 bar to about 20 bar, and in may cases from about 0.1 bar to about 10 bar. The partial pressure of carbon dioxide in the gas mixture will vary according to the gas composition and the pressure of operation but typically will be from about 0.1 to about 20 bar, preferably from about 0.1 to about 10 bar. The low pressure of flue gas, typically about 1 bar with $CO_2$ partial pressure correspondingly at about 0.1 bar may impose a limitation for $CO_2$ recovery but the cost of compression is relatively high and compression will not normally be favored with the present sorption process. The pressure when treating flue gas which enters from the combustion source at a low pressure is unlikely to exceed 1 bar. Natural gas is commonly at a higher pressure and may enter the treatment process at a pressure typically in the range of from about 1 to about 150 bar, with the actual value selected being dependent on pipelining specifications and the extent to which it is desired to eliminate recompression following treatment. All references to values of pressure in units of bars herein are in absolute pressures unless otherwise specifically noted.

The gas mixture can be contacted countercurrently or co-currently with the absorbent material at a gas hourly space velocity (GHSV) of from about 50 (S.T.P.)/hour to about 50,000 (S.T.P.)/hour.

The $CO_2$ may in favorable cases be effectively desorbed by a reduction in the partial pressure of the $CO_2$. The is may be effected by stripping with an inert (non-reactive) gas such as nitrogen or a natural gas stream; stripping at temperatures at or close to the sorption temperature is a preferred option for process economics, e.g., at a temperature not more than 10, 20 or 30° C. above the sorption temperature. Another option is to desorb the $CO_2$ with pure $CO_2$ (previously isolated) at 1 atm or higher at high temperatures, typically above 100 to 120° C. Water removed from the amine/base solution at desorption temperatures over 100° C. can be separated separately from the $CO_2$ in a further downstream separation step by pressure swing operation, preferably at an elevated temperature above ambient. Staged heat exchanger systems with knock out drums where water is removed first, followed by $CO_2$ as a pressurized gas stream may be used as one alternative. Selective $CO_2$ capture from wet $CO_2$-containing streams such as flue gas or wet natural gas may be achieved.

The stability of the reaction products may be such that isothermal (or near isothermal) sorption/desorption becomes possible by reduction of the $CO_2$ partial pressure in the desorption step, e.g., by stripping with a non-reactive gas for example, at a temperature preferably not more than 30° C. higher than the sorption temperature and when a particularly favorable amine/base combination is used, it may be possible to attain a sorption/desorption temperature differential of no more than 10 or 20° C. Typically, however, desorption is favored by an increase in the temperature of the solution with desorption being faster with greater temperature differentials. In situations where a non-aqueous solvent is used but water is present in the stream to be processed, regeneration may need to be performed at a temperature sufficient to remove the water and prevent build-up in the scrubbing loop. In such a situation, the $CO_2$ may be removed at pressures below atmospheric pressure, but above 100° C. For example, the regeneration temperature may be around 90° C., but to remove any water in the sorbent, temperatures in the range of 100 to 120° C. may be required. While this is less favorable energetically than desorption at temperatures below 100° C., it compares favorably to the significantly higher temperatures of 140 to 175° C. and higher used in conventional aqueous systems where the additional energy required for desorption has imposed substantial operating costs.

When these factors are taken into consideration the temperature selected for the desorption will typically be in the range of from about 70 to about 120° C., preferably from about 70 or 90 to about 100° C., and more preferably no greater than about 90° C.

The mixed alkanolamine/base sorbent system is not limited to removal of $CO_2$ but in view of the basic nature of the amines, is capable of removing other acid gases such as those typically found in flue gas and wellhead natural gas.

The Examples below illustrate the promotion of the O-carbonation reaction in alkanolamines by the secondary non-nucleophilic base component. Table 1 provides detailed information on O-carbonation yield, and total $CO_2$ loading on a molar basis of several alkanolamines at different molar ratios with a secondary base (1,1,3,3-tetramethylguanidine, TMG). For alkanolamines with primary and/or secondary amines (MEA, DEA, HEDA), the total yield of N-carboxylation per molecule is also shown. As comparative examples, Table 1 includes $CO_2$ uptake data for single component-alkanolamines (without a secondary base) in non-aqueous and aqueous solution.

EXAMPLES

Example 1

O-Carbonative $CO_2$ Uptake with TEA/TMG Sorbent System

Figure 2:
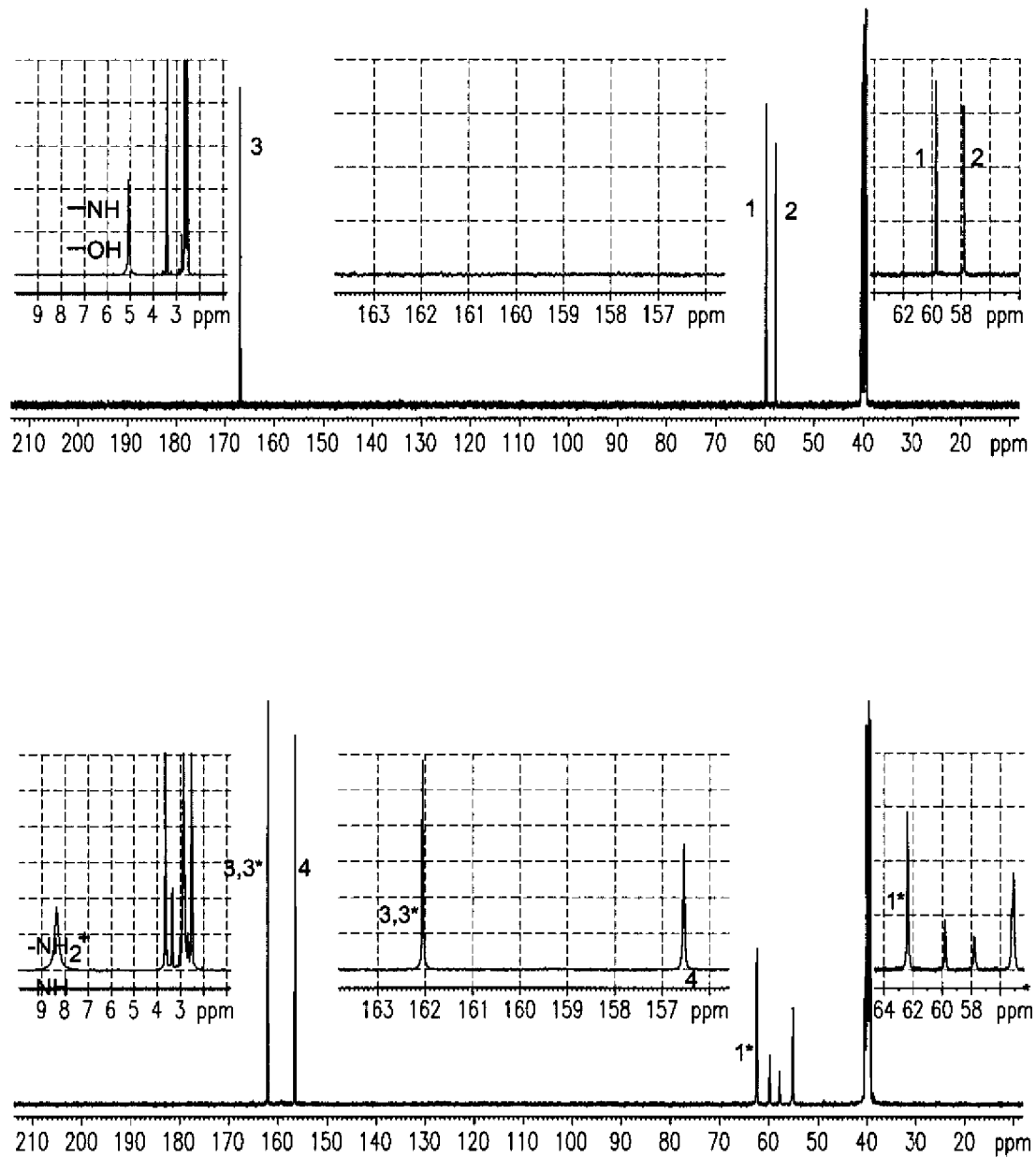
FIG. 2 shows the $^{13}C$ and $^1H$ NMR spectra of ~1:3 TEA:TMG (triethanolamine:tetramethylguanidine) in DMSO-$d_6$ solution before and after O-carbonation with $CO_2$.
Figure 2A:
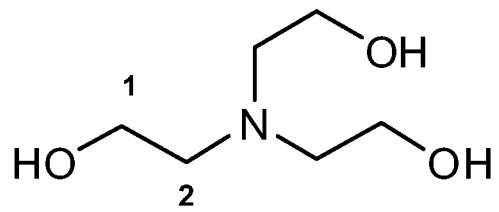
FIG. 2A shows keys to the structures associated with the correspondingly numbered spectral lines in FIG. 2 (top section).
Figure 2A:
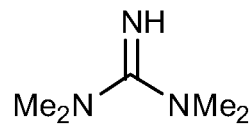
Figure 2B:
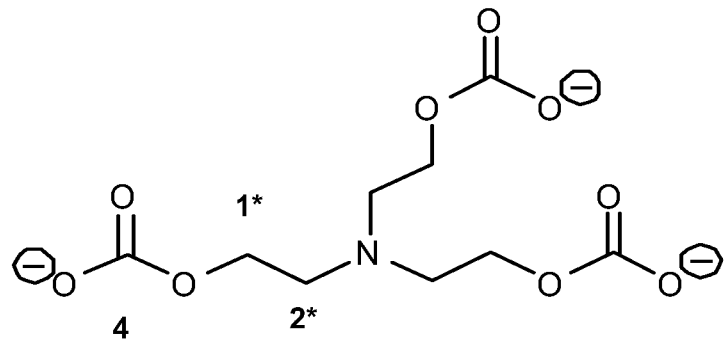
FIG. 2B shows keys to the structures associated with the correspondingly numbered spectral lines in FIG. 2 (bottom section).
Figure 2B:
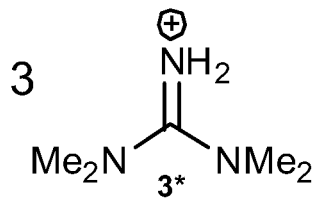

An approximately 30 wt % solution of a ~1:3 molar mixture of triethanolamine (TEA) and tetramethylguanidine (TMG) was prepared in $d_6$-DMSO in a ~5 mm NMR tube fitted with a plastic cap. The NMR tube was placed inside a ~5 mm narrow-bore Bruker Avance III 400 MHz NMR spectrometer with a QNP probe. After initial speciation and quantification of prepared solution (FIG. 2, top), $CO_2$ was bubbled (~1 atm, or ~100 kPa partial pressure, at ~5 cc/min, measured by a Brooks 5896 flow controller) through the room temperature solution outside of the NMR spectrometer for approximately 5 hours. As illustrated in FIG. 2, the initial spectra of the starting materials appeared to change upon $CO_2$ addition. The $^{13}C$ NMR peak at ~156.55 ppm (FIG. 2, bottom) appeared to represent a carbonation of alcohol groups of TEA (e.g., —O—$\underline{C}$OO$^-$). At the same time, the guanidinium C=N resonance appeared to shift to ~162.05 ppm, and the structural peaks of the TEA appeared to split to ~62.42/~59.80 ppm and ~55.09/~57.79 ppm, respectively, with a molar ratio of ~80.6%:~19.4%. The $^1H$ NMR peak at ~8.36 ppm was attributed to the —$NH_2^+$ counterion of the product (inset in FIG. 2, bottom). According to structural peak splitting and integration of the reaction product peak (~156.55 ppm) versus the structural peaks, ~80.6% of the alcohol groups were carboxylated to give a total $CO_2$ loading of ~2.42 $CO_2$ molecules per TEA molecule, or ~71.4 wt % of TEA. The keys to the structures in FIG. 2 (top) and FIG. 2 (bottom) are shown in FIGS. 2A and 2B, respectively.

The $CO_2$ saturated TEA:TMG mixture was then exposed to a $N_2$ purge of ~5 cc/min at ambient temperature in order to examine the stability of the reaction products. After ~2 hours under slow $N_2$ flow, $^{13}C$ and $^1H$ NMR spectroscopy (not shown) confirmed that ~13.3% of alcohol groups remained O-carbonated, to give a total loading ~0.40 $CO_2$ per TEA. The TEA:$CO_2$:TMG reaction products therefore appeared not to be stable and to be decomposable at temperatures slightly above ambient. After ~8 hours under a slow $N_2$ flow, ~96.7% of the alcohol groups appeared to be free of carbonation, which is believed to confirm almost complete $CO_2$ desorption at ambient temperature.

A similar procedure was carried out using a ~1:4 mixture of TEA and TMG in DMSO-$d_6$. The $^{13}C$ peak at ~156.49 ppm is believed to represent a carbonation of the alcohol groups of TEA (not shown). At the same time, the guanidinium C=N resonance appeared to shift to ~162.40 ppm, apparently confirming TMG reaction, and the structural peaks of the TEA appeared to split to ~62.41/~59.80 ppm and ~55.12/~57.81 ppm, respectively, with a molar ratio of ~90.8%:~9.2%. The $^1H$ NMR peak at ~8.50 ppm was attributed to the —$NH_2^+$ counterion of the product (not shown). According to integration of the reaction product peak (~156.49 ppm) over the split structural peaks, ~90.8% of the alcohol groups were O-carboxylated to give a total $CO_2$ loading of ~2.72 $CO_2$ molecules per TEA molecule, or ~80.3 wt % of TEA.

The $CO_2$ saturated TEA:TMG mixture was then exposed to a $N_2$ purge at ambient temperature in order to examine the stability of the reaction products. After ~13 hours under $N_2$ flow, only ~7.5% of the alcohol groups remained O-carbonated, to give a total loading ~0.23 $CO_2$ per TEA.

Comparative Example C1

$CO_2$ Uptake w/TEA in Aqueous/Non-Aqueous Solutions

A procedure similar to that described in Example 1 was carried out using a ~15 wt % solution of TEA in DMSO-$d_6$. After $CO_2$ treatment for ~3 hours, both $^{13}C$ and $^1H$ spectra (not shown) did not appear to change, which indicated the absence of a chemical reaction between $CO_2$ and TEA under non-aqueous conditions. A new $^{13}C$ resonance at ~125.18 ppm is believed to reflect physisorbed $CO_2$ (presumably through hydrogen bonding interactions between —OH groups of TEA and O=C=O) with a loading of about 0.13 $CO_2$ per TEA on average, or ~3.8 wt % of TEA. This was about 21 times less than the $CO_2$ loading of TEA in TMG solution.

A procedure similar to that described in Example 1 was carried out using a ~15 wt % solution of TEA in $H_2O$. After $CO_2$ treatment for ~2 hours, a new $^{13}C$ resonance was detected at ~160.28 ppm (not shown), believed to correspond to bicarbonate formation on the tertiary nitrogen of TEA (e.g., H$\underline{C}$OO$^-$). Integration of the product peak at ~160.28 ppm versus structural peaks at ~55.55 and ~55.28 ppm gave a calculated total $CO_2$ loading of about 0.86 $CO_2$ per TEA on average, or ~25.4 wt % of TEA. This was about 3 times less than the $CO_2$ loading of TEA in TMG solution.

Example 2

O-Carbonative $CO_2$ Uptake with DEA/TMG Sorbent System

Figure 3:
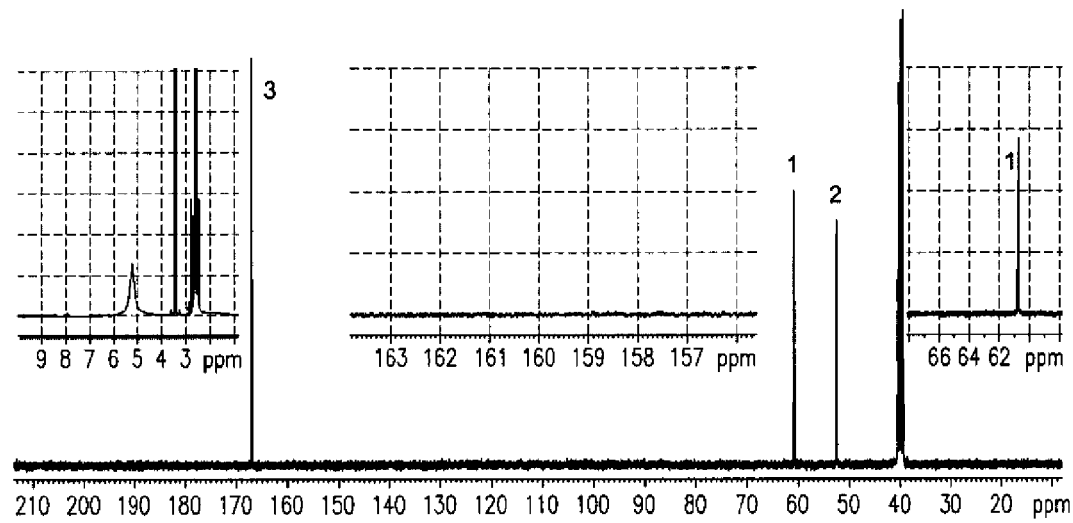
FIG. 3 shows the $^{13}C$ and $^1H$ NMR spectra of ~1:3 DEA:TMG (diethanolamine:tetramethylguanidine) in DMSO-$d_6$ solution before and after O-carbonation and N-carboxylation with $CO_2$.
Figure 3:
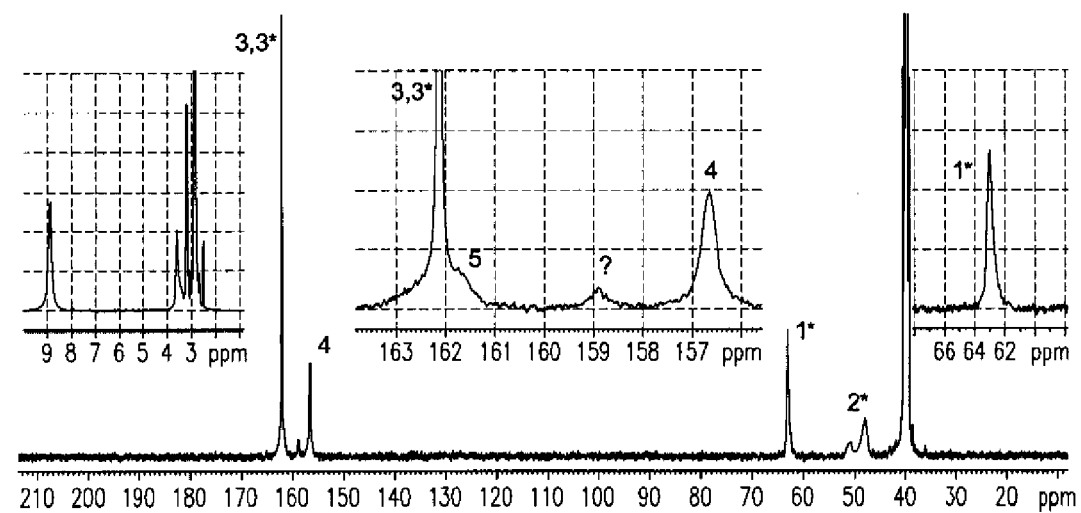
Figure 3A:
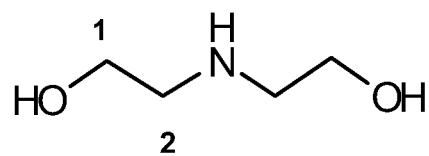
FIG. 3A shows keys to the structures associated with the correspondingly numbered spectral lines in FIG. 3 (top section).
Figure 3A:
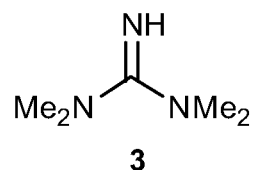

An approximately 30 wt % solution of a ~1:3 molar mixture of diethanolamine (DEA) and tetramethylguanidine (TMG) was prepared in d$_6$-DMSO in a ~5 mm NMR tube fitted with a plastic cap and capillary dip tube. After initial speciation and quantification of the prepared solution (FIG. 3, top), CO$_2$ was bubbled through the room temperature solution outside of the NMR spectrometer for approximately 2 hours. The keys to the structures in FIG. 3 (top) are shown in FIG. 3A. As illustrated in FIG. 3, the initial spectra of the starting materials appeared to change upon CO$_2$ addition.

Figure 3B:
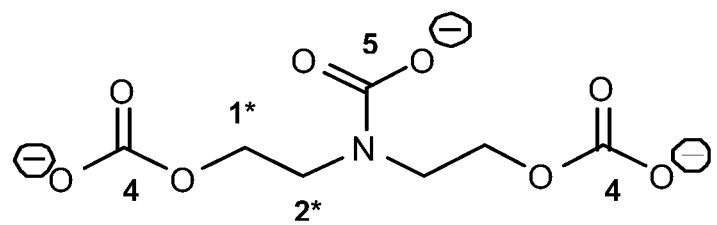
FIG. 3B shows keys to the structures associated with the correspondingly numbered spectral lines in FIG. 3 (bottom section).
Figure 3B:
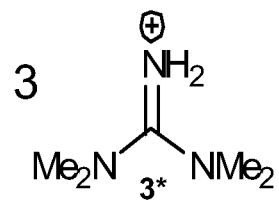

$^{13}$C NMR peaks at ~161.78 (overlapping with the guanidinium C=N resonance), ~159.01, and ~156.71 ppm are believed to represent reaction products of CO$_2$ with DEA in the presence of the strong base TMG (FIG. 3, bottom). The first peak at ~161.78 ppm was assigned as a mixed carbamate formed on the secondary amine of DEA (e.g., —N—COO$^-$) with a CO$_2$ loading of about 0.91 CO$_2$ molecules per DEA. Another two peaks at ~156.71 and ~159.01 ppm appear to show O-carbonation (e.g., —O—COO$^-$) of the alcohol groups of DEA with a CO$_2$ loading of ~1.59 CO$_2$ molecules per DEA (or ~0.79 CO$_2$ molecules per single alcohol group). The $^1$H NMR peak at ~8.89 ppm (inset in FIG. 3 bottom) was attributed to all —NH$_2^+$ counterions of the products which are in equilibrium with residual —OH and —NH groups. In the DEA:TMG mixture, the total CO$_2$ loading was ~2.50 CO$_2$ molecules per DEA, or ~104.7 wt % of DEA. The keys to the structures in FIG. 3 (bottom) are shown in FIG. 3B.

The CO$_2$-saturated DEA:TMG mixture was then exposed to a N$_2$ purge of ~5 cc/min at ambient temperature in order to examine the stability of the reaction products. After ~2 hours under N$_2$ flow, $^{13}$C and $^1$H NMR spectroscopy (not shown) appeared to confirm that ~6.3% of alcohol groups remain O-carbonated to give a total loading of ~0.13 CO$_2$ per DEA. The O-carbonated reaction products of DEA were therefore not observed to be stable and appeared to be decomposable at temperatures slightly above ambient. At the same time, decomposition of the mixed carbamate on the secondary amine of DEA (e.g., —N—COO$^-$) was not observed. The CO$_2$ loading in this type of product remained about 0.99 CO$_2$ per DEA molecule, giving about 1.12 CO$_2$ per DEA in both products.

A similar procedure was carried out using a ~1:2 mixture of DEA and TMG in DMSO-d$_6$. $^{13}$C NMR peaks at ~162.41 (overlapping with the guanidinium C=N resonance), ~158.97, and ~156.73 ppm were attributed to mixed carbamate formation on the secondary amine of DEA (e.g., —N—COO$^-$) and O-carbonation (e.g., —O—COO$^-$) of the alcohol groups of DEA, respectively. The $^1$H NMR peak at ~8.59 ppm (not shown) was attributed to all —NH$_2^+$ counterions of the products, which were believed to be in equilibrium with residual —OH and —NH groups. The total CO$_2$ loading of the combination of N- and O-carbonation products was calculated to be ~2.08 CO$_2$ per DEA, or ~87.2 wt % of DEA.

Comparative Example C2

CO$_2$ Uptake with DEA in Simple Non-Aqueous Solution

A procedure similar to described in Example 2 was carried out using ~15 wt % of DEA in DMSO-d$_6$ solution. After CO$_2$ treatment for ~4 hours, a new $^{13}$C NMR resonance was detected at ~161.56 ppm (not shown). Detailed analysis of the $^{13}$C and $^1$H NMR spectra appeared to confirm the formation of carbamate/carbamic acid on the secondary amine group of DEA. The alcohol groups appeared to remain inactive due to the low basicity of the secondary amine. Total CO$_2$ loading at room temperature was about 0.61 CO$_2$ per DEA, or ~25.6 wt % of DEA. This was about 4 times less than the CO$_2$ loading of DEA with TMG in solution.

Example 3

O-Carbonative/N-Carboxylative CO$_2$ Uptake with MEA/TMG Sorbent System

Figure 4:
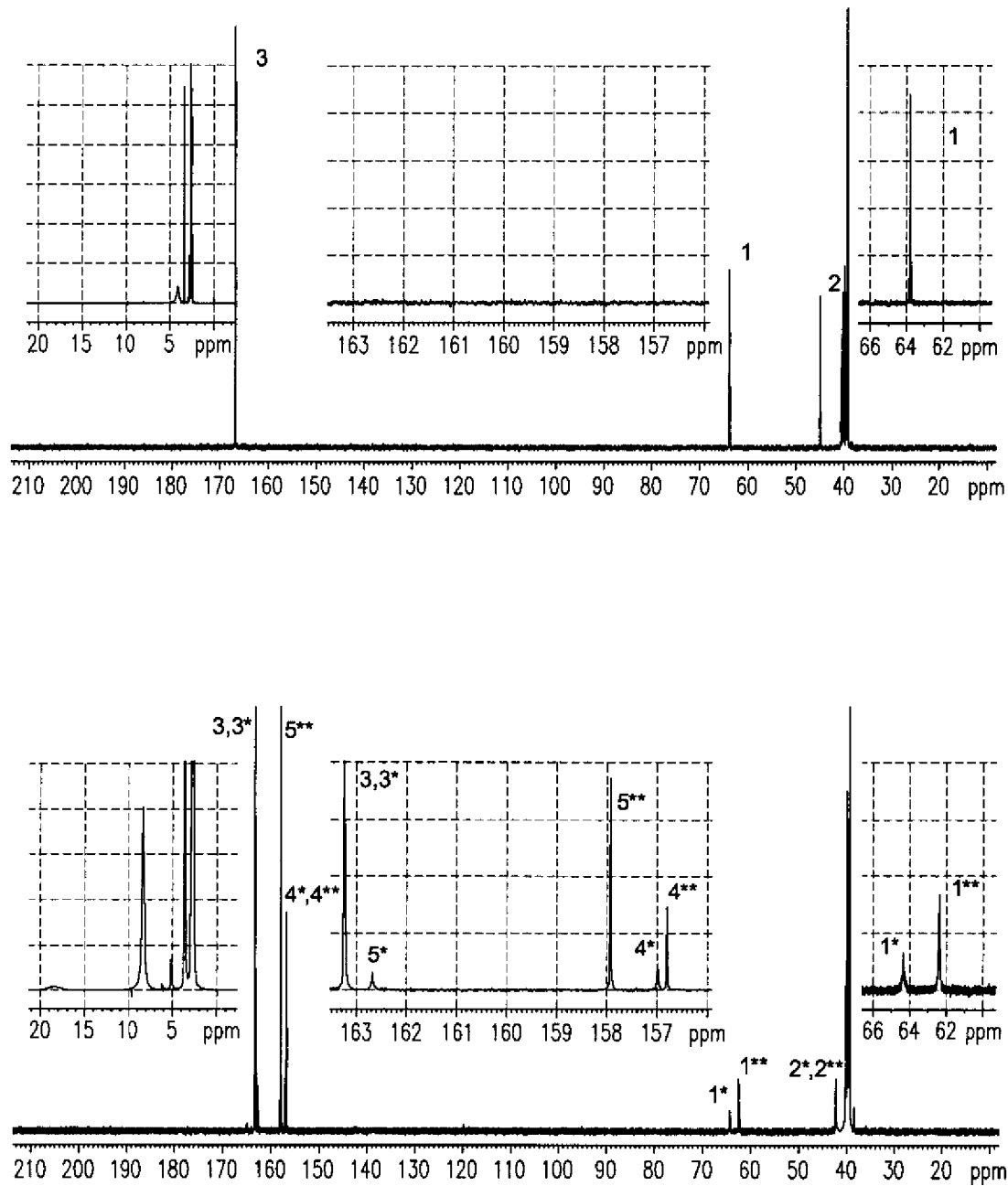
FIG. 4 shows the $^{13}C$ and $^1H$ NMR spectra of ~1:3 MEA:TMG (monoethanolamine:tetramethylguanidine) in DMSO-$d_6$ solution before and after O-carbonation and N-carboxylation with $CO_2$.
Figure 4A:
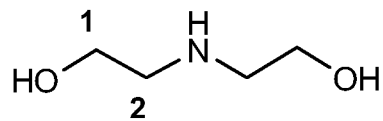
FIG. 4A shows keys to the structures associated with the correspondingly numbered spectral lines in FIG. 4 (top section).
Figure 4A:
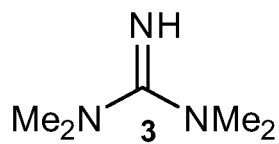

An approximately 50 wt % solution of a ~1:3 molar mixture of monoethanolamine (MEA) and tetramethylguanidine (TMG) was prepared in d$_6$-DMSO in a ~5 mm NMR tube fitted with a plastic cap and capillary dip tube. After initial speciation and quantification of prepared solution (FIG. 4, top), CO$_2$ was bubbled through the room temperature solution for approximately 1 hour. As illustrated in FIG. 4, the initial spectra of the starting materials appeared to change upon CO$_2$ addition. The keys to the structures in FIG. 4 (top) are shown in FIG. 4A.

Figure 4B:
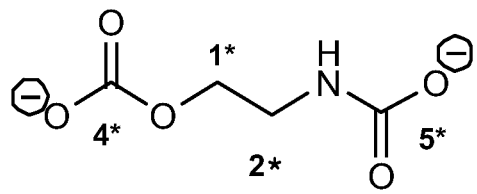
FIG. 4B shows keys to the structures associated with the correspondingly numbered spectral lines in FIG. 4 (bottom section).
Figure 4B:
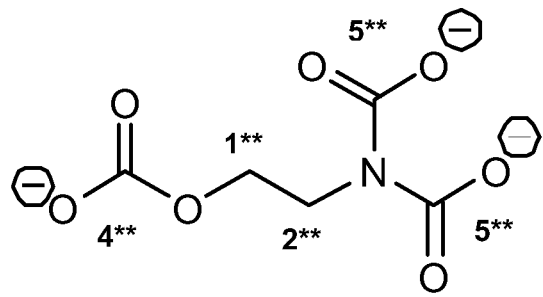
Figure 4B:
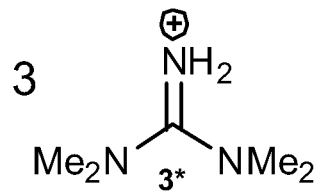

$^{13}$C NMR peaks at ~156.96 and ~156.80 ppm attributed to O-carbonation (e.g., —O—COO$^-$) products of the alcohol group of MEA molecules in the presence of the strong base TMG (FIG. 4, bottom). Peaks at ~162.67 and ~157.93 ppm were attributed to mixed carbamate formation (e.g., —N—COO$^-$) and mixed dicarbamate formation (e.g., $^-$OOC—N—COO$^-$), respectively, on the primary amine of MEA. Integration of the product peaks versus structural peaks at ~64.32 and ~62.38 ppm suggested complete O-carbonation of all MEA molecules. At the same time, ~36.8% of MEA molecules appeared to form a single N-carbamate on the primary amine of MEA and the remaining ~63.2% formed a dicarbamate on the primary amine (see keys to structures indicated in FIG. 4 (bottom) in FIG. 4B). The total CO$_2$ loading (including both O-carbonation and N-carboxylation products) was about 2.63 CO$_2$ molecules per MEA molecule, or ~189.7 wt % of MEA.

A similar procedure was carried out using a ~1:2 mixture of MEA and TMG in DMSO-d$_6$. $^{13}$C NMR peaks at ~156.84 and ~156.70 ppm were attributed to O-carbonation (e.g., —O—COO$^-$) products of the alcohol group of MEA molecules in the presence of the strong base TMG (not shown). Peaks at ~162.12 and ~157.89 ppm were attributed to mixed carbamate formation (e.g., —N—COO$^-$) and mixed dicarbamate formation (e.g., $^-$OOC—N—COO$^-$), respectively, on the primary amine of MEA. Integration of the product peaks versus structural peaks at ~64.08 and ~62.31 ppm suggested O-carbonation of ~74% of the MEA molecules. At the same time, O-carbonated and free MEA molecules appeared to react with CO$_2$ through carboxylation of primary amines, forming a single N-carbamate and a dicarbamate with TMG (see keys to structures indicated in FIG. 4 (bottom) in FIG. 4B). The total CO$_2$ loading (including both O-carbonation and N-carboxylation products) was calculated to be about 1.92 CO$_2$ molecules per MEA molecule, or ~138.5 wt % of MEA.

A similar procedure was carried out using a ~1:1 mixture of MEA and TMG in DMSO-d$_6$. The $^{13}$C NMR peak at ~156.97 ppm was attributed to O-carbonation (e.g., —O—COO$^-$) products of the alcohol group of the MEA molecules in the presence of the strong base TMG (not shown). Peaks at ~161.25 and ~157.92 ppm appeared to indicate mixed carbamate formation (e.g., —N—COO$^-$) and mixed dicarbamate formation (e.g., $^-$OOC—N—COO$^-$), respectively, on the primary amine of MEA. Integration of the product peaks versus structural peaks at ~63.86 and ~62.42 ppm suggested O-carboxylation of ~39% of the MEA molecules. At the same time, O-carbonated and free MEA molecules appeared to react with CO$_2$ through carboxylation of primary amines, forming a single N-carbamate and a dicarbamate with TMG (see keys to structures indicated in FIG. 4 (bottom) in FIG.

4B). The total $CO_2$ loading (including both O-carbonation and N-carboxylation products) was calculated to be about 1.48 $CO_2$ molecules per MEA molecule, or ~106.7 wt % of MEA.

Comparative Example C3

$CO_2$ Uptake w/MEA in Aqueous/Non-Aqueous Solutions

A procedure similar to that described in Example 3 was carried out using a ~15 wt % solution of MEA in DMSO-$d_6$. After $CO_2$ treatment for ~3 hours, a new $^{13}C$ NMR resonance was detected at ~161.07 ppm (not shown). Detailed analysis of $^{13}C$ and $^1H$ NMR spectra appeared to confirm formation of carbamate/carbamic acid on the primary amine site of MEA. The alcohol groups appeared to remain inactive due to the low basicity of the primary amine. Total $CO_2$ loading at room temperature was about 0.68 $CO_2$ molecules per MEA, or ~49.0 wt % of MEA. This was about 4 times less than the $CO_2$ loading of MEA in TMG solution.

A procedure similar to that described in Example 3 was carried out using a ~15 wt % solution of MEA in $H_2O$. After $CO_2$ treatment for ~2 hours, two new $^{13}C$ NMR resonances were detected at ~164.42 and ~160.59 ppm (not shown) indicating carbamate (e.g., —N—$\underline{C}$OO$^-$) and bicarbonate formation (e.g., H$\underline{C}$O$_{3-}$), respectively, on the primary amine of MEA. Integration of product peaks versus structural peaks gave a total $CO_2$ loading of about 0.85 $CO_2$ molecules per MEA, or ~61.3 wt % of TEA. This was about 3 times less than the $CO_2$ loading of MEA in TMG solution.

Example 4

$CO_2$ Uptake with HEEDA/TMG Sorbent System

An approximately 50 wt % solution of a ~1:3 molar mixture of hydroxyethyl ethylenediamine (HEEDA) and tetramethylguanidine (TMG) was prepared in $d_6$-DMSO in a ~5 mm NMR tube fitted with a plastic cap and capillary dip tube. After initial speciation and quantification of the prepared solution, $CO_2$ was bubbled through the room temperature solution for approximately 1 hour. The initial spectra of the starting materials appeared to change upon $CO_2$ addition.

The $^{13}C$ NMR peak at ~156.95 ppm was attributed to O-carbonation (e.g., —O—$\underline{C}$OO$^-$) products of the alcohol group of HEEDA molecules in the presence of the strong base TMG. Peaks at ~161.82 and ~157.91 ppm appeared to indicate mixed carbamate formation (e.g., —N—$\underline{C}$OO$^-$) and mixed dicarbamate formation (e.g., $^-$OO$\underline{C}$—N—$\underline{C}$OO$^-$), respectively, on the secondary and primary amines of HEEDA. Integration of the product peaks versus structural peaks at ~62.91 and ~47.26 ppm suggested O-carbonation of ~99% of HEEDA molecules. At the same time, secondary and primary amines of HEEDA molecules appeared to form a single N-carbamate and a dicarbamate product. The total $CO_2$ loading (including both O-carbonation and N-carboxylation products) was calculated to be about 1.95 $CO_2$ molecules per HEEDA molecule.

A similar procedure was carried out using a ~1:6 mixture of HEEDA and TMG in DMSO-$d_6$. The $^{13}C$ NMR peak at ~156.71 ppm was attributed to O-carbonation (e.g., —O—$\underline{C}$OO$^-$) products of the alcohol group of HEEDA molecules in the presence of the strong base TMG (not shown). Peaks at ~161.85 and ~157.87 ppm appeared to indicate mixed carbamate formation (e.g., —N—$\underline{C}$OO$^-$) and mixed dicarbamate formation (e.g., $^-$OO$\underline{C}$—N—$\underline{C}$OO$^-$), respectively, on the amines of HEEDA. Integration of the product peaks versus structural peaks at ~62.87 and ~46.50 ppm suggested O-carbonation of ~78% of the HEEDA molecules. At the same time, O-carbonated and free HEEDA molecules appeared to react with $CO_2$ through carboxylation of secondary and primary amines, forming a single N-carbamate and a dicarbamate with TMG. The total $CO_2$ loading (including both O-carbonation and N-carboxylation products) was calculated to be about 3.79 $CO_2$ molecules per HEEDA molecule.

Table 1 below summarizes the results from the Examples (solvent is $d_6$-DMSO except where noted).

Example 5

Vapor-Liquid Equilibrium of DMAE/TMG and $CO_2$ in $d_6$-DMSO

An approximately 63.3 wt % solution of ~1:1 molar mixture of dimethylaminoethanol (DMAE) and 1,1,3,3-tetramethylguanidine (TMG) in $d_6$-DMSO was heated to ~45° C. and then treated with a continuous flow of ~1 vol % $CO_2$ in $N_2$ at ~1 atm (~100 kPag), as described in the General Procedure. The solution was next treated with ~10 vol % $CO_2$ in $N_2$ at ~1 atm (~100 kPag), and finally with ~100 vol % $CO_2$ at ~1 am (~100 kPag). The equilibrium loading of $CO_2$ at these conditions was ~2.2, ~34.9, and ~67.6 mol %, respectively, and represented a dimethylaminoethanol/$CO_2$ vapor-liquid equilibrium at ~10 mbar (~1 kPa), ~100 mbar (~10 kPa), and ~1 bar (~100 kPa) of $CO_2$ at ~45° C.

Figure 5:
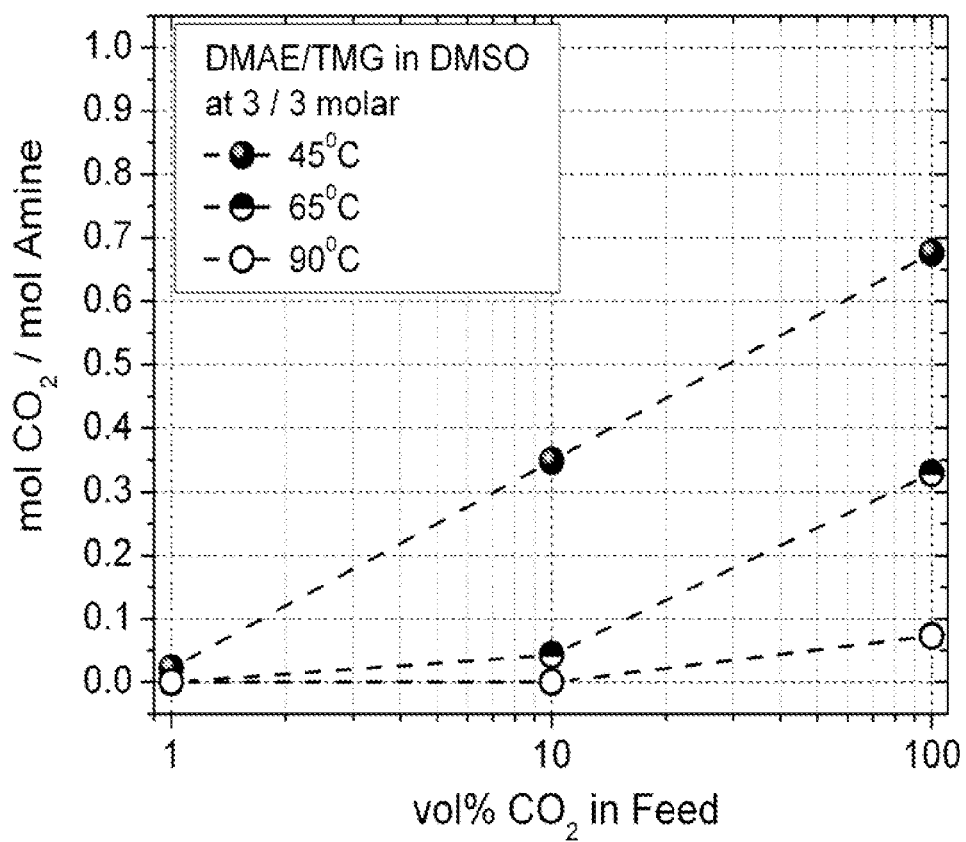
FIG. 5 shows a vapor-liquid equilibrium graph for the DMAE:TMG (dimethylaminoethanol:tetramethylguanidine) system with $CO_2$.

The same procedure was carried out with a fresh ~1:1 molar mixture of DMAE and TMG in DMSO-$d_6$ solution at ~65° C. and ~90° C. The monitoring results shown in FIG. 5 indicated a strong temperature dependence of $CO_2$ uptake capacity. This result appeared to confirm the low stability of the reaction product, which can be beneficial for achieving lower regeneration energy.

TABLE 1

Summary of results of Examples 1-4.

| Alkanolamine | Non-Nucleo-philic Base | Molar Ratio | Mol % O-Carb (1) | Moll % N-Carb (2) | Mol % $CO_2$ Uptake per alkanol-amine |
|---|---|---|---|---|---|
| Triethanol-amine (TEA) | Tetrameth-guanidine (TMG) | 1:3 | 80.6 | 0 | 242% |
| TEA | TMG | 1:4 | 90.8 | 0 | 272% |
| TEA | — | — | 0 | 0 | 3.8%(3) |
| TEA | — | — | 0 | 86 | 86% (5) |
| Diethanol-amine (DEA) | TMG | 1:3 | 79 | 91 | 250% |
| DEA | TMG | 1:2 | 55 | 97 | 208% |
| DEA | — | — | 0 | 61 | 61% |
| Monoethanol-amine (MEA) | TMG | 1:3 | 100 | 163 | 263% |
| MEA | TMG | 1:2 | 74 | 118 | 192% |
| MEA | TMG | 1:1 | 39 | 109 | 148% |
| MEA | — | — | 0 | 68 | 68% |
| MEA | — | — | 0 | 85(4) | 85%(4) |
| Hydroxyethyl ethylenediamine (HEEDA) | TMG | 1:3 | 99 | 96 | 195% |
| HEEDA | TMG | 1:6 | 78 | 301 | 379% |

(1) Mol % of O-Carbonation (e.g., —O—COO$^-$) per each —OH group of alkanolamine
(2) Mol % of N-Carboxylation (e.g., —N—COO$^-$ and $^-$OOC—N—COO$^-$) per secondary or primary amine of alkanolamine
(3) Physisorbed $CO_2$
(4) $H_2O$ solvent, chemisorbed product $CO_2$ in carbamate (—N—COO$^-$ . . . +$H_3N^+$) and bicarbonate (HCO$_3^-$ . . . +$H_3N^+$) forms
(5) $H_2O$ solvent, chemisorbed product as bicarbonate (HCO$_3^-$ . . . +$H_3N^+$)

What is claimed is:

1. A cyclic process for separating $CO_2$ from a gas stream, which process comprises contacting the gas stream with an absorbent comprising an alkanolamine $CO_2$ sorbent and a non-nucleophilic base, to form a reaction product by carbonation of oxygen(s) on the hydroxyl group(s) and carboxylation of nitrogen(s) of the amine group(s) of the alkanolamine so as to sorb $CO_2$ in the sorbent; wherein the ratio of non-nucleophilic base to alkanolamine is at least 1:1.

2. The process of claim 1, further including the step of treating the absorbent containing the sorbed $CO_2$ under conditions sufficient to cause desorption of at least a portion of the $CO_2$.

3. The process of claim 2, wherein the alkanolamine comprises one or more nucleophilic hydroxyl groups and one or more amino groups.

4. The process of claim 3, wherein the alkanolamine comprises one or more of monoethanolamine (MEA), diethanolamine (DEA), triethanolamine (TEA) N-methyldiethanolamine (MDEA), diglycolamine (DGA), 2-amino-2-methyl-1-propanol (AMP), hydroxyethyl-ethylenediamine (HEEDA), 2-amino-2-hydroxymethyl-1,3-propanediol (Tris), diisopropanolamine (DIPA), or ethoxyethanol-tertiarybutylamine (EETB).

5. The process of claim 1, wherein the non-nucleophilic base has a pKa higher than that of the amine site(s) of the alkanolamine.

6. The process of claim 1, wherein the non-nucleophilic base has a pKa of at least 10.

7. The process of claim 1, wherein the non-nucleophilic base has a pKa of at least 13.

8. The process of claim 1, wherein the non-nucleophilic base comprises an amine, an imine, an amidine or a guanidine.

9. The process of claim 1, wherein the non-nucleophilic base comprises 1,1,3,3-tetramethylguanidine.

10. The process of claim 2, wherein the gas stream is contacted with the absorbent at a temperature from ambient to 70° C.

11. The process of claim 2, wherein the $CO_2$ is desorbed from the absorbent containing the sorbed $CO_2$ at a temperature of not more than 90° C. to cause desorption of at least a portion of the sorbed $CO_2$.

12. The process of claim 11, wherein the gas stream is contacted with the absorbent at a temperature of 20 to 50° C.

13. The process of claim 12, wherein the $CO_2$ is desorbed from the absorbent containing the sorbed $CO_2$ at a temperature from 50 to 70° C.

14. The process of claim 1, wherein the absorbent comprises a liquid absorbent of the alkanolamine and the non-nucleophilic base.

15. The process of claim 14, wherein the absorbent comprises a liquid absorbent of the alkanolamine and the non-nucleophilic base dissolved in an aqueous or non-aqueous solvent.

16. The process of claim 14, wherein the alkanolamine comprises an alkanolamine with at least one primary amine group which undergoes reaction with the $CO_2$ on at least some of its amine groups in a double carboxylation reaction which two moles of $CO_2$ are taken up by the reacting amine groups.

17. The process of claim 1, wherein the alkanolamine or the non-nucleophilic base is integrated onto a porous support.

18. The process of claim 1, wherein the alkanolamine and the non-nucleophilic base are integrated onto a porous support.

19. The process of claim 17, wherein the porous support is comprised of a material selected from carbon, alumina, silica, silica-alumina, magensia, zeolites, and solid porous polymers.

20. The process of claim 18, wherein the porous support is comprised of a material selected from carbon, alumina, silica, silica-alumina, magensia, zeolites, and solid porous polymers.

21. A cyclic process for separating $CO_2$ from a gas stream, which process comprises:

(i) contacting the gas stream in a sorption zone with a liquid absorbent comprising an alkanolamine $CO_2$ sorbent and a non-nucleophilic base having a pKa higher than that of the amine in a polar solvent, to form a reaction product by carbonation of oxygen(s) on the hydroxyl group(s) and carboxylation of nitrogen(s) of the amine group(s) of the alkanolamine so as to sorb $CO_2$ in the sorbent, wherein the ratio of non-nucleophilic base to alkanolamine is at least 1:1, (ii) passing the liquid absorbent containing the sorbed $CO_2$ to a desorption zone to liberate $CO_2$ from the $CO_2$-containing absorbent liquid and regenerate the absorbent liquid by treating the absorbent containing the sorbed $CO_2$ under conditions sufficient to cause desorption of at least a portion of the $CO_2$, and (iii) returning the absorbent liquid from which the $CO_2$ has been liberated to the sorption zone.

22. The process of claim 21, wherein the absorbent comprises a liquid absorbent of the alkanolamine and the non-nucleophilic base dissolved in an aqueous or non-aqueous solvent.

23. The process of claim 21, wherein the alkanolamine comprises one or more of monoethanolamine (MEA), diethanolamine (DEA), triethanolamine (TEA) N-methyldiethanolamine (MDEA), diglycolamine (DGA), 2-amino-2-methyl-1-propanol (AMP), hydroxyethyl-ethylenediamine (HEEDA), 2-amino-2-hydroxymethyl-1,3-propanediol (Tris), diisopropanolamine (DIPA), or ethoxyethanol-tertiarybutylamine (EETB) and the non-nucleophilic base comprises an amine, an imine, an amidine or a guanidine.

* * * * *